(12) United States Patent
Shimonabe et al.

(10) Patent No.: US 8,768,362 B2
(45) Date of Patent: Jul. 1, 2014

(54) COMMUNICATION SYSTEM, MOBILE STATION, BASE STATION, AND COMMUNICATION METHOD

(75) Inventors: Tadashi Shimonabe, Osaka (JP); Akira Ohshima, Osaka (JP); Mitsuru Sakamoto, Osaka (JP); Yuhsuke Takagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 13/379,591

(22) PCT Filed: May 28, 2010

(86) PCT No.: PCT/JP2010/003601
§ 371 (c)(1),
(2), (4) Date: Dec. 20, 2011

(87) PCT Pub. No.: WO2010/150463
PCT Pub. Date: Dec. 29, 2010

(65) Prior Publication Data
US 2012/0100885 A1    Apr. 26, 2012

(30) Foreign Application Priority Data
Jun. 22, 2009   (JP) .............................. P2009-147693

(51) Int. Cl.
*H04W 36/36* (2009.01)
*H04Q 7/20* (2006.01)

(52) U.S. Cl.
USPC ......... 455/437; 455/67.11; 455/502; 455/436

(58) Field of Classification Search
USPC ......... 455/436, 502, 524, 439, 437, 438, 442,
455/452.1, 452.2, 67.11; 370/331, 336
See application file for complete search history.

(56) References Cited

U.S. PATENT DOCUMENTS

| 5,128,925 A | 7/1992 | Dornstetter et al. |
| 5,711,003 A * | 1/1998 | Dupuy .......................... 455/436 |

(Continued)

FOREIGN PATENT DOCUMENTS

| JP | 2-302133 A | 12/1990 |
| JP | 9-504144 A | 4/1997 |

(Continued)

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.7.0 (Dec. 2008), pp. 1-144.

(Continued)

*Primary Examiner* — John J Lee
(74) *Attorney, Agent, or Firm* — Birch, Stewart, Kolasch & Birch, LLP

(57) ABSTRACT

A communication system includes: a determination unit, provided in any one of a first base station, a second base station, and a mobile station, which determines a transmission timing change amount on the basis of reception timing of a signal transmitted between the first or second base station and the mobile station. The mobile station includes a handover execution unit which performs a handover from the first base station to the second base station on the basis of the transmission timing change amount calculated by the determination unit.

9 Claims, 13 Drawing Sheets

(56) References Cited

U.S. PATENT DOCUMENTS

| | | |
|---|---|---|
| 6,138,020 A * | 10/2000 | Galyas et al. .............. 455/436 |
| 2004/0128095 A1 | 7/2004 | Oestreich |
| 2010/0091743 A1 | 4/2010 | Kazmi et al. |
| 2010/0177688 A1 | 7/2010 | Kishiyama et al. |
| 2011/0034172 A1 | 2/2011 | Sahara |

FOREIGN PATENT DOCUMENTS

| | | |
|---|---|---|
| JP | 2001-508251 A | 6/2001 |
| JP | 2004-506392 A | 2/2004 |
| WO | WO 98/15152 A1 | 4/1998 |
| WO | 2008/118067 A2 | 10/2008 |
| WO | 2008-294862 A | 12/2008 |
| WO | WO 2009/128454 A1 | 10/2009 |
| WO | 2010-523041 A | 7/2010 |

OTHER PUBLICATIONS

3GPP, "Technical Specification Group Radio Access Network; Further Advancements for E-UTRA; Physical Layer Aspects (Release X)", 3GPP TS 36.814 V0.2.0 (Sep. 2008), pp. 1-16.

* cited by examiner

COMMUNICATION SYSTEM, MOBILE STATION, BASE STATION, AND COMMUNICATION METHOD

TECHNICAL FIELD

The present invention relates to a communication system, a mobile station, a base station, and a communication method.

The present application is based upon and claims the benefit of priority from prior Japanese Patent Application No. 2009-147693, filed Jun. 22, 2009, the entire contents of which are incorporated herein by reference.

BACKGROUND ART

At present, the standardization of Long Term Evolution-Advanced (LTE-A) by Third Generation Partnership Project (3GPP) is ongoing in relation to mobile communication technology. LTE-A is a standard into which LTE has developed.

In LTE, a mobile station communicates with one base station. On the other hand, in LTE-A, technology of coordinated multiple point transmission and reception (CoMP) is used. CoMP is technology in which a plurality of base stations share information and communicate with a mobile station in a coordinated manner.

User throughput or cell throughput at a cell edge is expected to be improved in LTE-A compared to LTE (Non-Patent Document 1). The use of CoMP in both downlink (DL) and uplink (UL) has been studied.

As a method using CoMP in DL, two types of methods have been mainly studied.

Like LTE, in the first method, a mobile station communicates with a base station one-to-one, but a plurality of neighboring base stations share information and perform scheduling or beam-forming in a coordinated manner, thereby reducing interference.

Unlike LTE, in the second method, a plurality of base stations simultaneously transmit signals to one mobile station, and the mobile station combines and demodulates the signals, thereby improving reception quality.

In addition, a method in which a plurality of base stations receive and combine signals transmitted by mobile stations, thereby improving reception quality, has been studied as a method using CoMP in UL.

Here, physical layers of LTE and LTE-A will be described. In the physical layers, physical channels and physical signals are defined. In DL physical channels, six types of a physical DL shared channel (PDSCH), a physical broadcast channel (PBCH), a physical multicast channel (PMCH), a physical control format indicator channel (PCFICH), a physical DL control channel (PDCCH), and a physical hybrid automatic repeat request (HARQ) indicator channel (PHICH) are defined.

In DL physical signals, two types of a reference signal (RS) and a synchronization signal are defined.

In UL physical channels, three types of a physical UL shared channel (PUSCH), a physical UL control channel (PUCCH), and a physical random access channel (PRACH) are defined.

In a UL physical signal, one type of RS is defined.

PDSCH and PUSCH are physical channels mainly for transmitting user data or control data. PBCH is a physical channel for transmitting broadcast information. PMCH is a physical channel for transmitting multicast data such as a broadcast.

PCFICH is a physical channel for notifying of the number of symbols of PDCCH. PDCCH is a physical channel for transmitting a scheduling or transmission power control (TPC) command and the like of PDSCH or PUSCH. PHICH is a physical channel for transmitting ACK/NACK of HARQ for PUSCH.

PUCCH is a physical channel for transmitting ACK/NACK of HARQ for PDSCH, channel quality information (CQI), a precoding matrix indication (PMI), a rank indication (RI), and the like. PRACH is a physical channel for transmitting a preamble of random access.

In addition, UL and DL RSs are physical signals to be used for channel estimation or a CQI measurement. The synchronization signal is a physical signal to be used for a cell search.

In mobile communication, when a mobile station moves during communication (during voice communication, during data communication, or the like), a handover process for changing a base station to communicate with the mobile station is performed. The handover process in LTE will be described with reference to FIGS. 14 and 15 (Non-Patent Document 2).

In state 1 of FIG. 14, signals to be transmitted/received between base stations 100A and 100B and a mobile station 200 before a handover in LTE are shown.

In state 1 of FIG. 14, the base station 100A transmits a signal or channel of each of PDSCH, PCFICH, PDCCH, PHICH, and RS to the mobile station 200 using DL.

In addition, in state 1 of FIG. 14, the mobile station 200 transmits a signal or channel of each of PUSCH, PUCCH, and RS to the base station 100A using UL.

In addition, in state 1 of FIG. 14, the base station 100B transmits RS to the mobile station 200 using DL.

In state 2 of FIG. 14, signals to be transmitted/received between the base stations 100A and 100B and the mobile station 200 after the handover in LTE are shown.

In state 2 of FIG. 14, the base station 100A transmits RS to the mobile station 200 using DL.

In addition, in state 2 of FIG. 14, the base station 100B transmits a signal or channel of each of PDSCH, PCFICH, PDCCH, PHICH, and RS to the mobile station 200 using DL.

In addition, in state 2 of FIG. 14, the mobile station 200 transmits a signal or channel of each of PUSCH, PUCCH, and RS to the base station 100B using UL.

FIG. 15 is a sequence diagram showing processes of the mobile station 200 and the base stations 100A and 100B in LTE.

First, the base station 100A instructs the mobile station 200 to measure reception qualities, reception timings, or the like of signals transmitted from peripheral base stations including the base station 100A (step S3001).

On the basis of the instruction of step S3001, the mobile station 200 measures the reception qualities, the reception timings, or the like of signals transmitted from the peripheral base stations (step S3002). In the reception quality measurement, a reception level, path loss, signal to noise ratio (S/N), or the like of RS is used.

The mobile station 200 transmits measurement results including the reception qualities or the reception timings measured in step S3002 to the base station 100A (step S3003).

The base station 100A determines whether or not to perform a handover process on the basis of a measurement result report of step S3003 (step S3004). For example, the base station 100A determines to perform the handover process if the reception quality of a signal transmitted by the neighboring base station 100B to the mobile station 200 is better than the reception quality of a signal transmitted by the base station 100A to the mobile station 200.

If the handover process is determined to be performed in step S3004, the base station 100A transmits a handover request to the base station 100B (step S3005).

The base station 100B prepares the handover, and transmits a handover response to the base station 100A to notify the base station 100A of handover preparation completion when the preparation is completed (step S3006).

The base station 100A receiving the handover response from the base station 100B transmits a handover instruction to the mobile station 200 (step S3007).

The mobile station 200 releases communication with the base station 100A (step S3008). The mobile station 200 transmits PRACH to the base station 100B so as to acquire synchronization with the base station 100B (step S3009).

The base station 100B performs a random access process with the mobile station 200. In the random access process, the base station 100B calculates a transmission timing change amount of which an indication is sent to the mobile station 200. Specifically, the base station 100B receives a random access request of step S3009, calculates a difference between reception timing when the base station 100B receives the signal transmitted from the mobile station 200 and reception timing expected by the base station 100B, and calculates the transmission timing change amount from the timing difference (step S3010).

The base station 100B transmits a random access response including the calculated transmission timing change amount to the mobile station 200 (step S3011).

On the basis of the random access response received in step S3011, the mobile station 200 calculates transmission timing directed to the base station 100B based on transmission timing directed to the base station 100A and the transmission timing change amount included in the random access response. The mobile station 200 is wirelessly connected to the base station 100B and initiates communication with the base station 100B (step S3012).

The mobile station 200 transmits a handover completion notification to the base station 100B (step S3013).

Next, DL CoMP in which a plurality of base stations simultaneously transmit data to one mobile station as shown in FIG. 16 will be described.

In state 1 of FIG. 16, signals transmitted/received between base stations 101A and 101B and a mobile station 201 before a handover in CoMP are shown.

In state 1 of FIG. 16, the base station 101A transmits a signal or channel of each of PDSCH, PCFICH, PDCCH, PHICH, and RS to the mobile station 201 using DL.

In addition, in state 1 of FIG. 16, the mobile station 201 transmits a signal or channel of each of PUSCH, PUCCH, and RS to the base station 101A using UL.

In addition, in state 1 of FIG. 16, the base station 101B transmits a signal or channel of each of PDSCH and RS to the mobile station 200 using DL. The base station 101B transmits PCFICH and PDCCH to the mobile station 201, if necessary.

In state 2 of FIG. 16, signals transmitted/received between the base stations 101A and 101B and the mobile station 201 after the handover in CoMP are shown.

In state 2 of FIG. 16, the base station 101A transmits a signal or channel of each of PDSCH and RS to the mobile station 201 using DL. In addition, the base station 101A transmits PCFICH and PDCCH to the mobile station 201, if necessary.

In addition, in state 2 of FIG. 16, the base station 101B transmits a signal or channel of each of PDSCH, PCFICH, PDCCH, PHICH, and RS to the mobile station 201 using DL.

In addition, in state 2 of FIG. 16, the mobile station 201 transmits a signal or channel of each of PUSCH, PUCCH, and RS to the base station 101B using UL.

In state 1 of FIG. 16, the base station 101A receives UL data from the mobile station 201. When the mobile station 201 moves, a handover process is performed, for example, if UL quality directed to the base station 101B is better than UL quality directed to the base station 101A. In the handover process, a base station, which receives UL data transmitted from the mobile station 201 and transmits DL control channels (PCFICH, PDCCH, and PHICH) to the mobile station 201, is changed from the base station 101A to the base station 101B.

On the other hand, DL data is not changed before/after the handover process. That is, the mobile station 201 receives the DL data from both the base stations 101A and 101B. In this state, the mobile station 201 needs to release communication so as to perform the random access process when the handover process is performed in LTE. At this time, the mobile station 201 should stop communication even in DL data that does not need to be changed.

PRIOR ART DOCUMENTS

Non-Patent Documents

Non-Patent Document 1: 3GPP R1-084615 (TR36.814 v0.2.0): 8, "Coordinated multiple point transmission and reception (overview of CoMP)"

Non-Patent Document 2: 3GPP TS36.300 V8.7.0: 10.1.2.1, "Handover (handover in LTE)"

DISCLOSURE OF INVENTION

Problem to be Solved by the Invention

The present invention has been made in view of the above-described circumstances, and an object of the present invention is to provide a communication system, a mobile station, a base station, and a communication method capable of performing a fast handover in which a mobile station does not need to perform a random access to a base station.

Means for Solving the Problem (1) A first aspect of the present invention is a communication system including: a determination unit, provided in any one of a first base station, a second base station, and a mobile station, which determines a transmission timing change amount on the basis of reception timing of a signal transmitted between the first or second base station and the mobile station, wherein the mobile station includes a handover execution unit which performs a handover from the first base station to the second base station on the basis of the transmission timing change amount calculated by the determination unit.

(2) In the transmission device according to the first aspect of the present invention, the mobile station may include: a measurement unit which measures reception timings of signals transmitted by the first and second base stations; and the determination unit, and wherein the transmission timing change amount is determined on the basis of the reception timings measured by the measurement unit.

(3) In the transmission device according to the first aspect of the present invention, the mobile station may include: a measurement unit which measures reception timings of signals transmitted by the first and second base stations; and a transmission unit which transmits the reception timings measured by the measurement unit to the first base station, and wherein the first base station includes the determination unit and determines the transmission timing change amount on the basis of the reception timings transmitted by the transmission unit.

(4) In the transmission device according to the first aspect of the present invention, the mobile station may include: a measurement unit which measures reception timings of signals transmitted by the first and second base stations; and a transmission unit which transmits the reception timings measured by the measurement unit to the second base station, and wherein the second base station includes the determination unit and determines the transmission timing change amount on the basis of the reception timings transmitted by the transmission unit.

(5) A second aspect of the present invention is a mobile station which communicates with first and second base stations, the mobile station including: a measurement unit which measures reception timings of signals transmitted by the first and second base stations; a determination unit which determines the transmission timing change amount on the basis of the reception timings measured by the measurement unit; and a handover execution unit which performs a handover from the first base station to the second base station on the basis of the transmission timing change amount calculated by the determination unit.

(6) A third aspect of the present invention is a base station which communicates with a mobile station and another base station, the base station including: a reception unit which receives reception timing of a signal transmitted between the other base station or its own base station and the mobile station; a determination unit which determines a transmission timing change amount based on the reception timing received by the reception unit; and a transmission unit which transmits the transmission timing change amount determined by the determination unit to the mobile station.

(7) A fourth aspect of the present invention is a communication method including: determining, by any one of a first base station, a second base station, and a mobile station, a transmission timing change amount on the basis of reception timing of a signal transmitted between the first or second base station and the mobile station; and performing, by the mobile station, a handover from the first base station to the second base station on the basis of the transmission timing change amount calculated in the determination.

Effects of the Invention

According to a communication system, a mobile station, a base station, and a communication method of the present invention, it is possible to perform a fast handover in which a mobile station does not need to perform a random access to a base station.

BEST MODE FOR CARRYING OUT THE INVENTION

Hereinafter, embodiments of the present invention will be described with reference to the drawings.

[First Embodiment]

A communication system of this embodiment includes base stations 300A and 300B and a mobile station 400.

Figure 1:
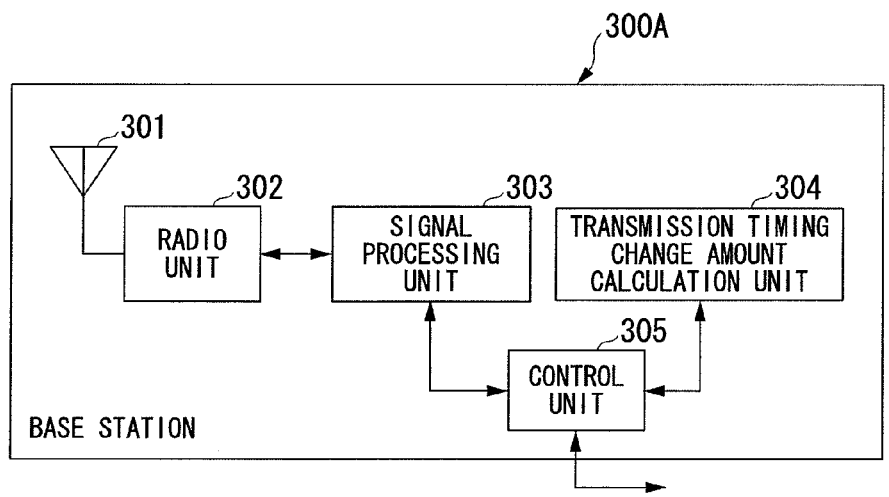
FIG. 1 is a schematic block diagram showing a configuration of a base station 300A according to a first embodiment of the present invention.

FIG. 1 is a schematic block diagram showing a configuration of the base station 300A according to the first embodiment of the present invention. If transmission/reception timings of the base stations 300A and 300B are consistent, the base station 300A of FIG. 1 calculates a transmission timing change amount on the basis of a signal received by a signal processing unit from a mobile station or timing information (time $T_D$) received from another base station via a core network. In addition, the base station 300A of FIG. 1 transmits the calculated transmission timing change amount to the mobile station via the signal processing unit, or transmits the calculated transmission timing change amount to another base station via the core network.

Because a configuration of the base station 300B is the same as that of the base station 300A, description thereof is omitted.

The base station 300A includes an antenna 301, a radio unit 302, a signal processing unit 303, a transmission timing change amount calculation unit 304, and a control unit 305.

Only components necessary to describe this embodiment are shown as components of the base station 300A, and description and illustration of components used for usual wireless communication provided in other base stations 300A are omitted.

The antenna 301 receives a signal transmitted by the mobile station 400 and outputs the received signal to the radio unit 302. In addition, the antenna 301 transmits a signal output by the radio unit 302 as a radio signal to the mobile station 400.

The radio unit 302 down-converts a signal output by the antenna 301 and outputs the down-converted signal to the signal processing unit 303. In addition, the radio unit 302 up-converts a signal output by the signal processing unit 303, and outputs the up-converted signal to the antenna 301.

The signal processing unit 303 performs a process of demodulating the signal output by the radio unit 302, and outputs the demodulated signal to the control unit 305. In addition, the signal processing unit 303 acquires data to be transmitted by the base station 300A to the mobile station 400 from the control unit 305, performs a process of modulating the data, and outputs the modulated data to the radio unit 302.

The transmission timing change amount calculation unit 304 determines a transmission timing change amount of which an indication is sent to the mobile station 400 on the basis of timing information output by the control unit 305. When the mobile station 400 switches a communication destination from the base station 300A to the base station 300B, the transmission timing change amount indicates how much the mobile station 400 needs to change signal transmission timing. The transmission timing change amount calculation unit 304 outputs information of the calculated transmission timing change amount to the control unit 305.

The control unit 305 transmits the information output by the signal processing unit 303 or the transmission timing change amount calculation unit 304 to the core network. In addition, the control unit 305 outputs information received from the core network to the signal processing unit 303 or the transmission timing change amount calculation unit 304.

Figure 2:
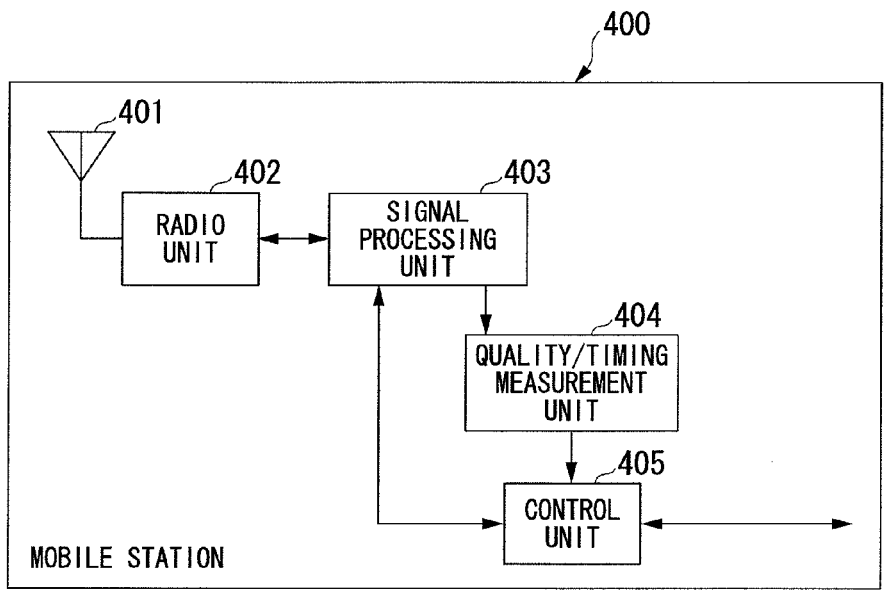
FIG. 2 is a schematic block diagram showing a configuration of a mobile station 400 according to the first embodiment of the present invention.

FIG. 2 is a schematic block diagram showing a configuration of the mobile station 400 according to the first embodiment of the present invention. The mobile station 400 includes an antenna 401, a radio unit 402, a signal processing unit 403, a quality/timing measurement unit 404, and a control unit 405.

The antenna 401 receives signals transmitted by the base stations 300A and 300B, and outputs the received signals to the radio unit 402. In addition, the antenna 401 transmits a signal output by the radio unit 402 as a radio signal to the base stations 300A and 300B.

The radio unit 402 down-converts a signal output by the antenna 401, and outputs the down-converted signal to the signal processing unit 403. In addition, the radio unit 402 up-converts a signal output by the signal processing unit 403, and outputs the up-converted signal to the antenna 401.

The signal processing unit 403 performs a process of demodulating a signal output by the radio unit 402, and outputs the demodulated signal to the control unit 405 and the quality/timing measurement unit 404. In addition, the signal processing unit 403 acquires data to be transmitted by the mobile station 400 to the base stations 300A and 300B from the control unit 405, performs a process of modulating the acquired data, and outputs the modulated data to the radio unit 402.

The quality/timing measurement unit 404 measures reception qualities or reception timings of RSs received by the mobile station 400 from the base stations 300A and 300B on the basis of a signal output by the signal processing unit 403, and outputs measurement results to the control unit 405. Here, in a reception timing measurement, for example, the signal processing unit 403 demodulates RS according to previously measured reception timing, calculates a phase difference by correlating the demodulated RS symbol with an RS symbol neighboring in a frequency direction, determines how much the reception timing is shifted from previous timing from the calculated phase difference, and updates reception timing.

The control unit 405 outputs information output by the signal processing unit 403 to an upper layer of the mobile station 400. In addition, the control unit 405 outputs information acquired from the upper layer or quality or timing information output by the quality/timing measurement unit 404 to the signal processing unit 403.

Figure 16:
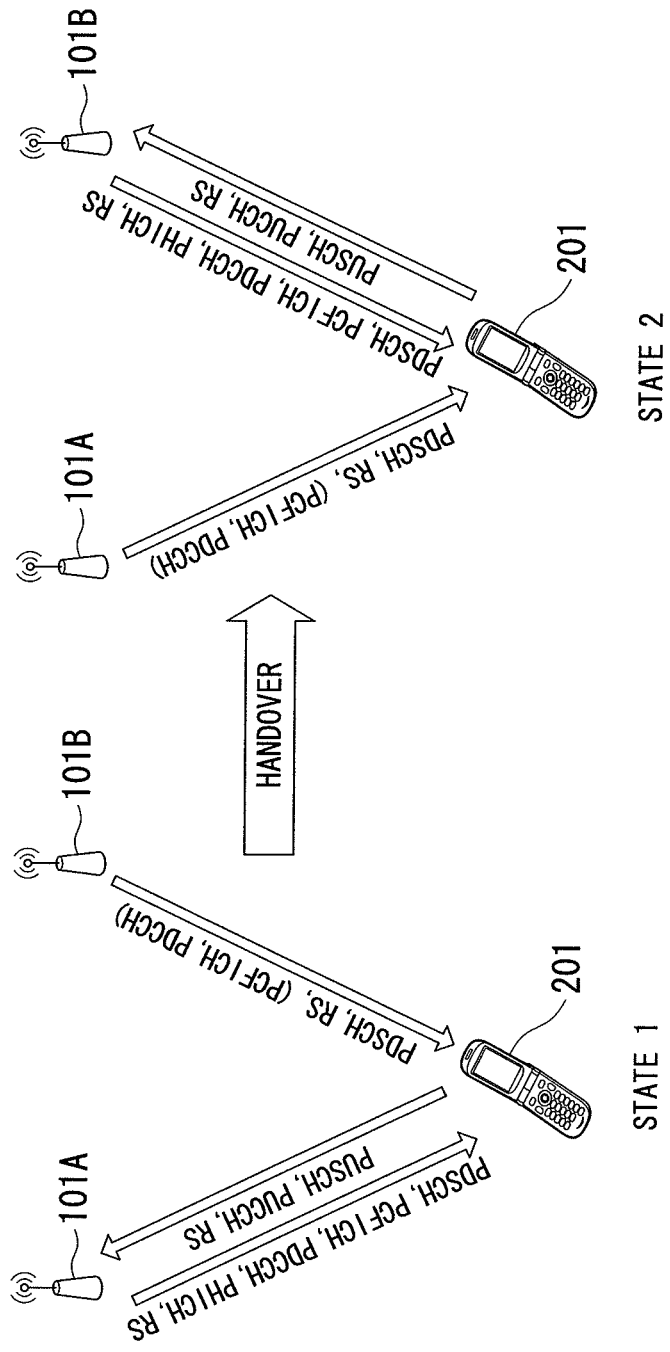
FIG. 16 is a diagram showing signals transmitted/received between base stations 101A and 101B and a mobile station 201 before/after a handover in CoMP.

The communication system of this embodiment uses CoMP described with reference to FIG. 16. Before the handover, DL data is transmitted simultaneously from the base stations 300A and 300B to the mobile station 400. That is, the mobile station 400 simultaneously receives PDSCHs transmitted from the base stations 300A and 300B, and demodulates data.

To demodulate PDSCH, the mobile station 400 needs to receive each of PDCCH on which scheduling information is transmitted, PCFICH necessary to receive PDCCH, and RS necessary for channel estimation.

The mobile station 400 may respectively receive PDCCHs from both the base stations 300A and 300B or the mobile station 400 may receive PDCCH from either the base station 300A or the base station 300B. When PDCCH is received from any one base station, PDCCH including scheduling information of PDSCHs transmitted from the two base stations 300A and 300B is transmitted to the mobile station 400.

The mobile station 400 receives PCFICH from the base station that receives PDCCH. The mobile station 400 needs to receive RSs from both the base stations 300A and 300B so as to perform channel estimation.

UL data is transmitted from the mobile station 400 to only the base station 300A. Thus, only the base station 300A receives PUSCH from the mobile station 400. Accordingly, the mobile station 400 receives PHICH on which ACK/NACK of HARQ for PUSCH is notified from the base station 300A.

In addition, the mobile station 400 transmits ACK/NACK of HARQ for PDSCH. Thus, the mobile station 400 needs to transmit PUCCH. Here, only the base station 300A receives PUCCH from the mobile station 400. In addition, only the base station 300A also receives RS necessary to demodulate PUSCH or PUCCH from the mobile station 400. Accordingly, ACK/NACK of HARQ for PDSCH transmitted from the base station 300B is notified to the base station 300B via the base station 300A, if necessary.

In addition, CQI necessary for scheduling is also notified to the base station 300B via the base station 300A, if necessary. Accordingly, only the base station 300A usually receives a UL physical channel or physical signal from the mobile station 400. After the handover, conversely, only the base station 300B receives a UL channel or signal from the mobile station 400.

Figure 3:
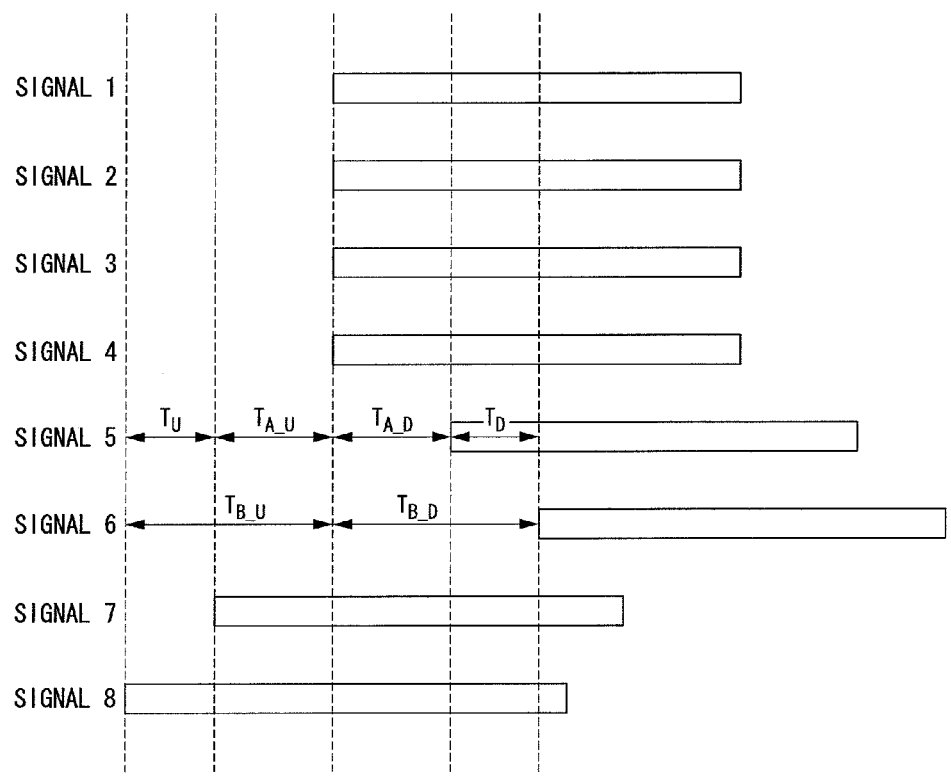
FIG. 3 is a diagram showing a relationship between transmission/reception timings of base stations 300A and 300B and the mobile station 400 according to the first embodiment of the present invention.

FIG. 3 is a diagram showing a relationship between transmission/reception timings of base stations 300A and 300B and the mobile station 400 according to the first embodiment of the present invention. In FIG. 3, the horizontal axis represents time. A white rectangle indicates a radio frame at a certain moment.

Signal 1 of FIG. 3 indicates transmission timing of the base station 300A.

Signal 2 of FIG. 3 indicates reception timing of the base station 300A.

Signal 3 of FIG. 3 indicates transmission timing of the base station 300B.

Signal 4 of FIG. 3 indicates reception timing of the base station 300B.

Signal 5 of FIG. 3 indicates reception timing of a signal from the base station 300A in the mobile station 400.

Signal 6 of FIG. 3 indicates reception timing of a signal from the base station 300B in the mobile station 400.

Signal 7 of FIG. 3 indicates transmission timing of the mobile station 400 before the handover.

Signal 8 of FIG. 3 indicates transmission timing of the mobile station 400 after the handover.

Times $T_{A\_U}$ and $T_{A\_D}$ of signal 5 of FIG. 3 are UL and DL propagation delays between the base station 300A and the mobile station 400, respectively. Times $T_{B\_D}$ and $T_{B\_D}$ of signal 6 of FIG. 3 are UL and DL propagation delays between the base station 300B and the mobile station 400, respectively.

Time $T_D$ of signal 5 of FIG. 3 is a timing difference between signals of the base stations 300A and 300B received by the mobile station 400. Time $T_U$ of signal 5 of FIG. 3 is a transmission timing difference between signals from the mobile station 400 before/after the handover.

In LTE-A, as in LTE, DL adopts orthogonal frequency division multiplexing (OFDM). Thus, in the case of CoMP in which the mobile station simultaneously receives signals from a plurality of base stations, a timing difference between signals received from the plurality of base stations needs to be within a cyclic prefix (CP) length. A CP is created by copying an end part of a symbol into a front guard interval of an OFDM symbol for the purpose of removing inter-symbol interference or the like. Accordingly, it is basically necessary to acquire synchronization between base stations.

In addition, the adoption of discrete Fourier transform (DFT)-precoded OFDM for UL has been studied. Thus, the base station side needs to simultaneously receive signals from a plurality of mobile stations. The signals need to be within the CP length.

Accordingly, the base station initiatively sends an indication of a transmission timing change amount to each mobile station, thereby adjusting reception timing in the base station. Here, the case where all transmission/reception timings of the base stations 300A and 300B are consistent will be described.

In this case, transmission timing of a signal of the mobile station 400 is indicated and determined from the base station 300A before the handover. The transmission timing is set to be earlier than reception timing of the base station 300A by UL propagation delay time $T_{A\_U}$ between the base station 300A and the mobile station 400.

In addition, after the handover, the transmission timing of a signal of the mobile station 400 is indicated and determined from the base station 300B. The transmission timing is set to be earlier than reception timing of the base station 300B by UL propagation delay time $T_{B\_U}$ between the base station 300B and the mobile station 400.

Figure 4:
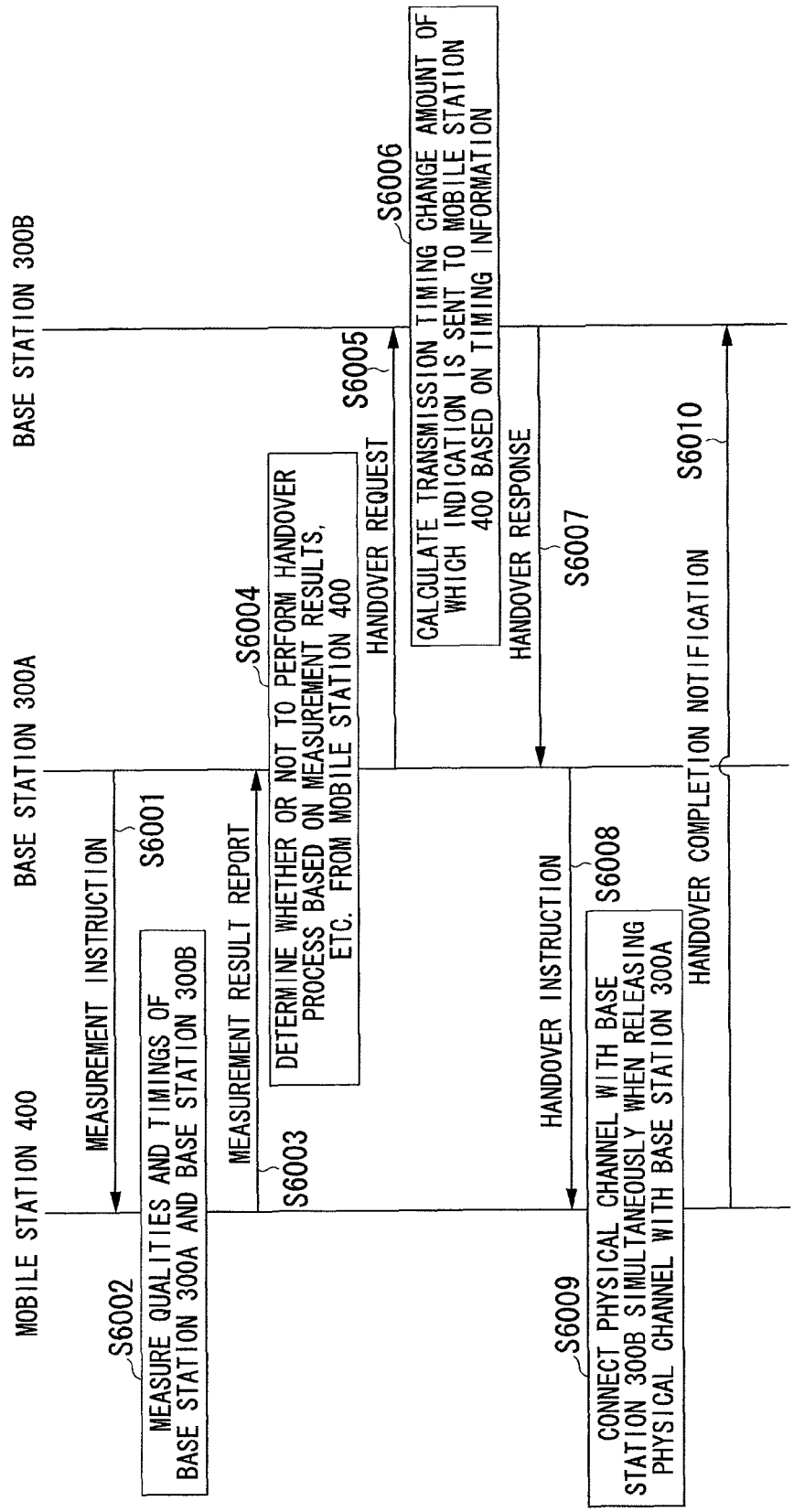
FIG. 4 is a sequence diagram showing a handover process of a communication system according to the first embodiment of the present invention.

FIG. 4 is a sequence diagram showing a handover process of the communication system according to the first embodiment of the present invention.

First, the control unit 305 of the base station 300A transmits a measurement instruction to the mobile station 400 via the signal processing unit 303, the radio unit 302, and the antenna 301 (step S6001). The measurement instruction is used to instruct the mobile station 400 to measure reception qualities, reception timings, or the like of signals transmitted from peripheral base stations (the base station 300B and the like) including the base station 300A.

The control unit 405 of the mobile station 400 receives the measurement instruction transmitted by the base station 300A in step S6001. The quality/timing measurement unit 404 of the mobile station 400 measures reception qualities or reception timings of RSs transmitted from the peripheral base stations 300A and 300B (step S6002). In the reception quality measurement, a reception level, path loss, S/N, or the like of RS is used.

The control unit 405 of the mobile station 400 transmits measurement results including the reception qualities, the reception timings, or the like measured in step S6002 to the base station 300A via the signal processing unit 403, the radio unit 402, and the antenna 401 (step S6003). For example, as shown in signal 5 of FIG. 3, the mobile station 400 transmits a timing difference (time $T_D$) between signals transmitted from the base stations 300A and 300B to the base station 300A. Timing information (counter values or the like within the mobile station 400) of signals transmitted from the base stations 300A and 300B is transmitted to the base station 300A, so that the base station 300A may calculate the signal timing difference (time $T_D$).

The control unit 305 of the base station 300A determines whether or not to perform the handover process on the basis of a measurement result report of step S6003 (step S6004). For example, if the reception quality of the mobile station 400 for the signal transmitted by the neighboring base station 300B is better than the reception quality of the mobile station 400 for the signal transmitted by the base station 300A, the control unit 305 of the base station 300A determines to perform the handover process.

Here, when it is determined whether or not to perform the handover process, the determination may be made by considering various elements such as a communication congestion state as well as the report from the mobile station 400.

When determining to perform the handover process in step S6004, the control unit 305 of the base station 300A transmits a handover request including timing information received from the mobile station 400 in step S6003 to the base station 300B via the signal processing unit 303, the radio unit 302, and the antenna 301 (step S6005).

When CoMP is performed, various information (scheduling information, CQI, and the like) is periodically exchanged between the base stations 300A and 300B. Accordingly, the timing information may be previously periodically notified from the base station 300A to the base station 300B without notifying of it when the handover request is made in step S6005.

The transmission timing change amount calculation unit 304 of the base station 300B calculates a transmission timing change amount on the basis of the timing information received from the base station 300A (step S6006). The transmission timing change amount is necessary when the handover for the mobile station 400 from the base station 300A to the base station 300B is performed and the signal is transmitted to the base station 300B. In this embodiment, transmission/reception timings of the base stations 300A and 300B are synchronized. Thus, as shown in signal 5 of FIG. 3, it is necessary to change the transmission timing after the handover to be time $T_U$ earlier than the transmission timing before the handover. Time $T_U$ is a difference between UL propagation delay times $T_{B\_D}$ and $T_{A\_U}$.

In this embodiment, times $T_{A\_U}$ and $T_{A\_D}$ are considered to be identical. In addition, times $T_{B\_U}$ and $T_{B\_D}$ are considered to be identical. Thus, time $T_U$ is identical to time $T_D$. The reason is as follows. That is, there are time division duplex (TDD) and frequency division duplex (FDD) in LTE or LTE-A. In the case of TDD, because the same frequency band operates in UL and DL, a propagation delay is also identical in UL and DL. In addition, in the case of FDD, because different frequency bands operate in UL and DL, there is a possibility that a propagation delay difference is caused by a difference of a propagation state of each frequency band. However, the transmission timing of the mobile station 400 is adjusted on the basis of an instruction from the base station in a certain cycle without being changed in real time. Thus, because the base station can be configured to perform reception at slightly shifted timing, a propagation delay difference may be absorbed. Accordingly, time $T_U$ may be identical to time $T_D$.

If a preparation related to the handover is completed, the control unit 305 of the base station 300B receiving the handover request in step S6005 transmits a handover response including the timing information calculated in step S6006 to the base station 300A via the signal processing unit 303, the radio unit 302, and the antenna 301 (step S6007).

The control unit 305 of the base station 300A receiving the handover response in step S6007 transmits a handover instruction including the transmission timing change amount to the mobile station 400 via the signal processing unit 303, the radio unit 302, and the antenna 301 (step S6008).

The control unit 405 of the mobile station 400 releases a physical channel with the base station 300A, changes transmission timing on the basis of the indicated transmission timing change amount, and connects a physical channel with the base station 300B (step S6009). Thereby, the mobile station 400 performs the handover from the base station 300A to the base station 300B.

The control unit 405 of the mobile station 400 transmits a handover completion notification to the base station 300B via the signal processing unit 403, the radio unit 402, and the antenna 401 (step S6010).

The quality/timing measurement unit 404 (also referred to as a measurement unit) of the mobile station 400 of the communication system according to the first embodiment of the present invention measures reception timings of signals transmitted by the base station 300A (also referred to as a first base station) and the base station 300B (also referred to as a second base station).

In addition, the control unit 405 (also referred to as a transmission unit) of the mobile station 400 transmits reception timing measured by the quality/timing measurement unit 404 to the base station 300B.

In addition, the transmission timing calculation unit 304 (also referred to as a determination unit) of the base station 300B determines a transmission timing change amount (time $T_U$) on the basis of reception timings of signals (RSs) transmitted by the radio units 302 of the base stations 300A and 300B.

In addition, the control unit 405 (also referred to as a handover execution unit) of the mobile station 400 performs the handover from the base station 300A to the base station 300B on the basis of a transmission timing change amount (time $T_U$) calculated by the transmission timing calculation unit 304 of the base station 300B.

According to the communication system of the first embodiment of the present invention, a fast handover in which the mobile station 400 does not need to perform a random access to the base station 300B can be performed. Consequently, the mobile station 400 can smoothly change a communication destination without causing instantaneous interruption of communication or the like.

Although the case where the base station 300B calculates the transmission timing change amount has been described with reference to FIG. 4, the present invention is not limited thereto. The base station 300A also recognizes information (time $T_D$) of a DL propagation delay. Thus, the transmission timing change amount may be calculated by the base station 300A.

In addition, although the case where DL data such as a handover instruction is transmitted from the base station 300A to the base station 400 has been described with reference to FIG. 4, the present invention is not limited thereto. The DL data is simultaneously wirelessly transmitted from both the base stations 300A and 300B to the mobile station 400. Thus, for example, if the base station 300A becomes a main base station that controls CoMP, data may be transmitted from only the base station 300A to the mobile station 400. In addition, data from only the base station 300B may be transmitted from the base station 300A to the mobile station 400 via the base station 300B. In addition, data from both the base stations 300A and 300B may be transmitted to the mobile station 400.

In addition, if a separate control station, which controls the base stations 300A and 300B, controls CoMP, data from only the base station 300A may be transmitted from the control station to the mobile station 400 via the base station 300A. In addition, data from only the base station 300B may be transmitted from the control station to the mobile station 400 via the base station 300B. In addition, data from both the base stations 300A and 300B may be transmitted from the control station to the mobile station 400 via the base stations 300A and 300B.

Likewise, it is possible to calculate timing even when a timing relationship between the base stations 300A and 300B is reversed.

[Second Embodiment]

Next, a communication system according to the second embodiment of the present invention will be described. In the first embodiment, the base station 300B calculates a transmission timing change amount. On the other hand, the case where a mobile station calculates the transmission timing change amount will be described in the second embodiment.

The communication system according to the second embodiment of the present invention includes base stations 310A and 310B and a mobile station 410. Description of the same parts of the second embodiment as those of the first embodiment is omitted.

Figure 5:
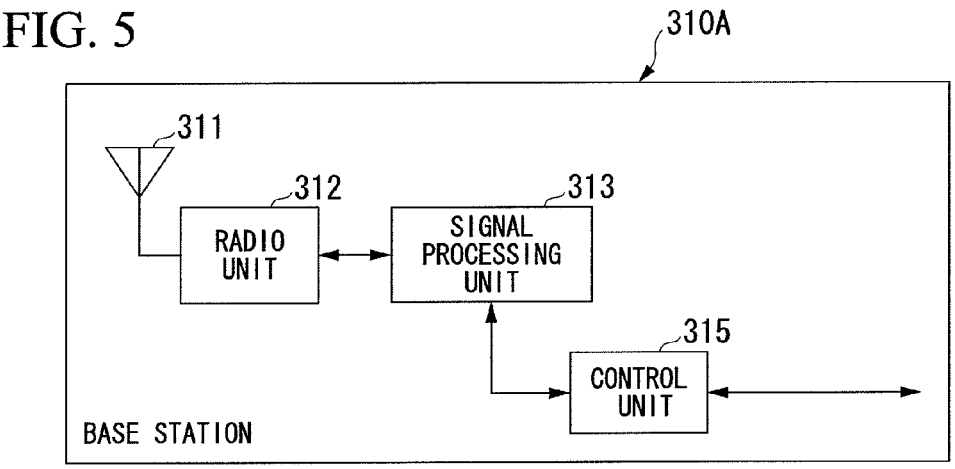
FIG. 5 is a schematic block diagram showing a configuration of a base station 310A according to a second embodiment of the present invention.

FIG. 5 is a schematic block diagram showing a configuration of the base station 310A according to the second embodiment of the present invention. In this embodiment, the mobile station 410 calculates a transmission timing change amount if transmission/reception timings of the base stations 310A and 310B are consistent. FIG. 5 shows a base station of the above-described case.

Because a configuration of the base station 310B is the same as that of the base station 310A, description thereof is omitted.

The base station 310A includes an antenna 311, a radio unit 312, a signal processing unit 313, and a control unit 315.

The antenna 311 receives a signal transmitted by the mobile station 410 and outputs the received signal to the radio unit 312. In addition, the antenna 311 transmits a signal output by the radio unit 312 as a radio signal to the mobile station 410.

The radio unit 312 down-converts a signal output by the antenna 311 and outputs the down-converted signal to the signal processing unit 313. In addition, the radio unit 312 up-converts a signal output by the signal processing unit 313, and outputs the up-converted signal to the antenna 311.

The signal processing unit 313 performs a process of demodulating the signal output by the radio unit 312, and outputs the demodulated signal to the control unit 315. In addition, the signal processing unit 313 acquires data to be transmitted by the base station 310A to the mobile station 410 from the control unit 315, performs a process of modulating the data, and outputs the modulated data to the radio unit 312.

The control unit 315 transmits information output by the signal processing unit 313 to the core network. In addition, the control unit 315 outputs information received from the core network to the signal processing unit 313.

Figure 6:
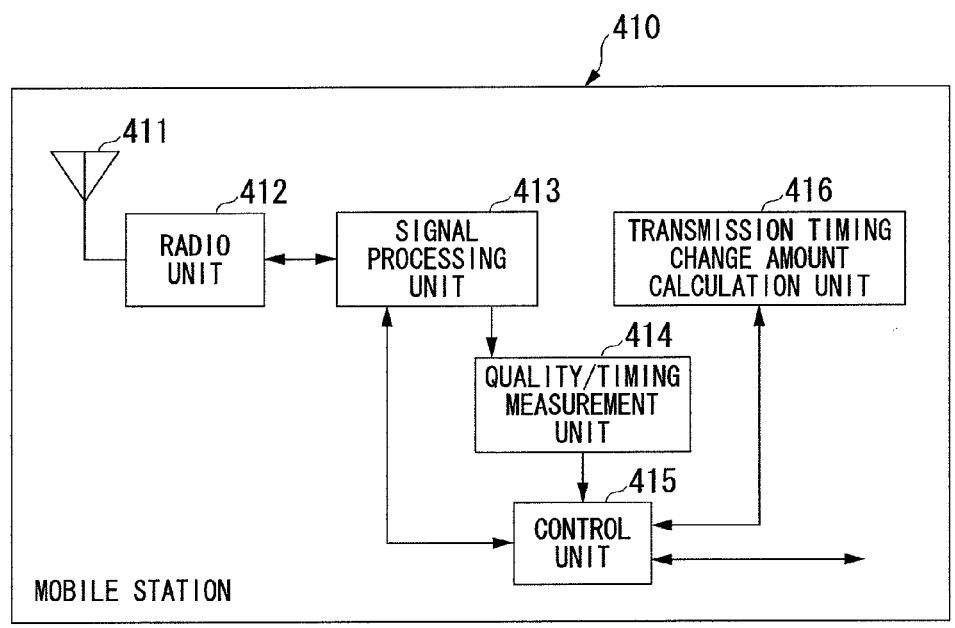
FIG. 6 is a schematic block diagram showing a configuration of a mobile station 410 according to the second embodiment of the present invention.

FIG. 6 is a schematic block diagram showing a configuration of the mobile station 410 according to the second embodiment of the present invention. The mobile station 410 includes an antenna 411, a radio unit 412, a signal processing unit 413, a quality/timing measurement unit 414, a control unit 415, and a transmission timing change amount calculation unit 416.

The antenna 411 receives signals transmitted by the base stations 310A and 310 B, and outputs the received signals to the radio unit 412. In addition, the antenna 411 transmits a signal output by the radio unit 412 as a radio signal to the base stations 310A and 310B.

The radio unit 412 down-converts a signal output by the antenna 411, and outputs the down-converted signal to the signal processing unit 413. In addition, the radio unit 412 up-converts a signal output by the signal processing unit 413, and outputs the up-converted signal to the antenna 411.

The signal processing unit 413 performs a process of demodulating a signal output by the radio unit 412, and outputs the demodulated signal to the control unit 415 and the quality/timing measurement unit 414. In addition, the signal processing unit 413 acquires data to be transmitted by the mobile station 410 to the base stations 310A and 310B from the control unit 415, performs a process of modulating the acquired data, and outputs the modulated data to the radio unit 412.

The quality/timing measurement unit 414 measures reception qualities or reception timings of RSs received by the mobile station 400 from the base stations 310A and 310B on the basis of a signal output by the signal processing unit 413, and outputs measurement results to the control unit 415.

The control unit 415 outputs information output by the signal processing unit 413 to an upper layer of the mobile station 410. In addition, the control unit 415 outputs information acquired from the upper layer or timing information output by the quality/timing measurement unit 414 to the signal processing unit 413. In addition, the control unit 415 outputs the timing information output by the quality/timing measurement unit 414 to the transmission timing change amount calculation unit 416.

The transmission timing change amount calculation unit 416 determines a transmission timing change amount on the basis of the timing information output by the control unit 415. When the mobile station 410 switches a communication destination from the base station 310A to the base station 310B, the transmission timing change amount indicates how much the mobile station 410 needs to change signal transmission timing. The transmission timing change amount calculation unit 416 outputs information of the calculated transmission timing change amount to the control unit 415.

Figure 7:
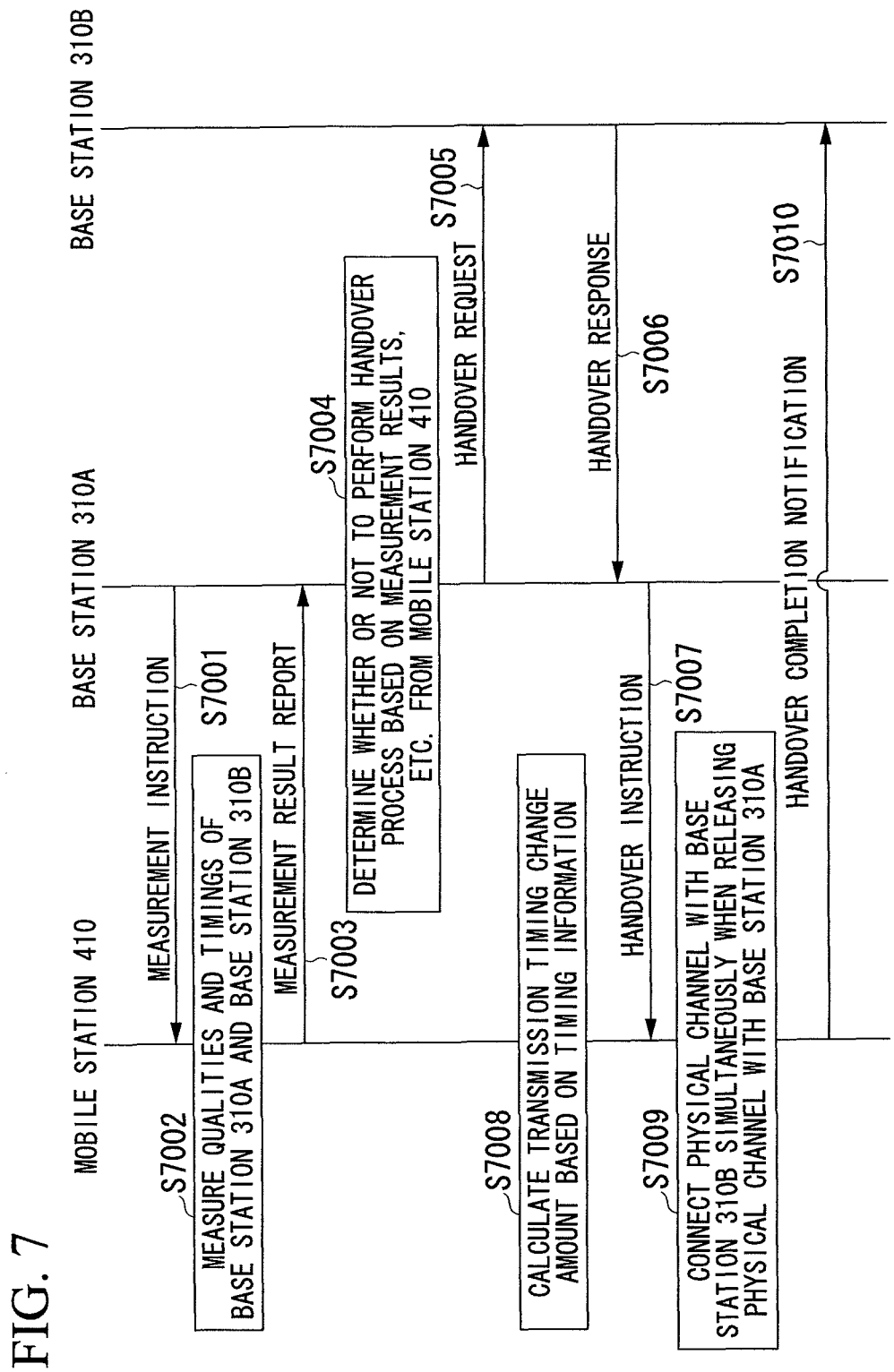
FIG. 7 is a sequence diagram showing a handover process of a communication system according to the second embodiment of the present invention.

FIG. 7 is a sequence diagram showing a handover process of the communication system according to the second embodiment of the present invention.

First, the control unit 315 of the base station 310A transmits a measurement instruction to the mobile station 410 via the signal processing unit 313, the radio unit 312, and the antenna 311 (step S7001).

The control unit 415 of the mobile station 410 receives the measurement instruction transmitted by the base station 310 in step S7001. The quality/timing measurement unit 414 of the mobile station 410 measures reception qualities or reception timings of RSs transmitted by the base stations 310A and 310B to the mobile station 410 (step S7002).

The transmission timing change amount calculation unit 416 of the mobile station 410 calculates a transmission timing change amount based on information of the reception timings measured in step S7002 (step S7008). The transmission timing change amount calculation unit 416 of the second embodiment calculates the transmission timing change amount using the same method as that of the transmission timing change amount calculation unit 304 of the first embodiment.

The control unit 415 of the mobile station 400 transmits measurement results including the reception qualities measured in step S7002 to the base station 310A via the signal processing unit 413, the radio unit 412, and the antenna 411 (step S7003).

The control unit 315 of the base station 310A determines whether or not to perform the handover process based on a measurement result report received from the mobile station 410 in step S7003 (step S7004). The control unit 315 of the second embodiment determines whether or not to perform the handover process using the same method as that of the control unit 305 of the first embodiment.

When determining to perform the handover process in step S7004, the control unit 315 of the base station 310A transmits a handover request to the base station 310B via the signal processing unit 313, the radio unit 312, and the antenna 311 (step S7005).

If a preparation related to the handover is completed, the control unit 315 of the base station 310B receiving the handover request in step S7005 transmits a handover response to the base station 310A via the signal processing unit 313, the radio unit 312, and the antenna 311 (step S7006).

The control unit 315 of the base station 310A receiving the handover response in step S7006 transmits a handover instruction to the mobile station 410 via the signal processing unit 313, the radio unit 312, and the antenna 311 (step S7007).

The control unit 415 of the mobile station 410 releases a physical channel with the base station 310A, changes transmission timing on the basis of the transmission timing change amount calculated in step S7008, and connects a physical channel with the base station 310B (step S7009). Thereby, the mobile station 410 performs the handover from the base station 300A to the base station 300B.

The control unit 415 of the mobile station 410 transmits a handover completion notification to the base station 310B via the signal processing unit 413, the radio unit 412, and the antenna 411 (step S7010).

Here, step S7008 may be performed after the handover instruction of step S7007 has been received.

The quality/timing measurement unit 414 (also referred to as a measurement unit) of the mobile station 410 of the communication system according to the second embodiment of the present invention measures reception timings of signals transmitted by the base station 310A (also referred to as a first base station) and the base station 310B (also referred to as a second base station).

In addition, the transmission timing calculation unit 416 (also referred to as a determination unit) of the mobile station 410 determines a transmission timing change amount (time $T_U$) on the basis of reception timings of signals (RSs) transmitted by the radio units 312 of the base stations 310A and the 310B.

In addition, the control unit 415 (also referred to as a handover execution unit) of the mobile station 410 performs the handover from the base station 310A to the base station 310B on the basis of the transmission timing change amount (time $T_U$) calculated by the transmission timing calculation unit 416 of the mobile station 410.

According to the communication system according to the second embodiment of the present invention, as in the first embodiment, a fast handover in which the mobile station 410 does not need to perform a random access to the base station 310B can be performed. Consequently, the mobile station 410 can smoothly change a communication destination without causing instantaneous interruption of communication or the like.

[Third Embodiment]

Next, a communication system according to the third embodiment of the present invention will be described. Description of the same parts of the third embodiment as those of the first embodiment is omitted.

The communication system according to the third embodiment includes base stations and a mobile station. Because a configuration of the mobile station according to the third embodiment is the same as that of the mobile station 400 (FIG. 2) according to the first embodiment, description thereof is omitted.

In the third embodiment, a mobile station 400 performs a handover from a base station 320A to a base station 320B.

Figure 8:
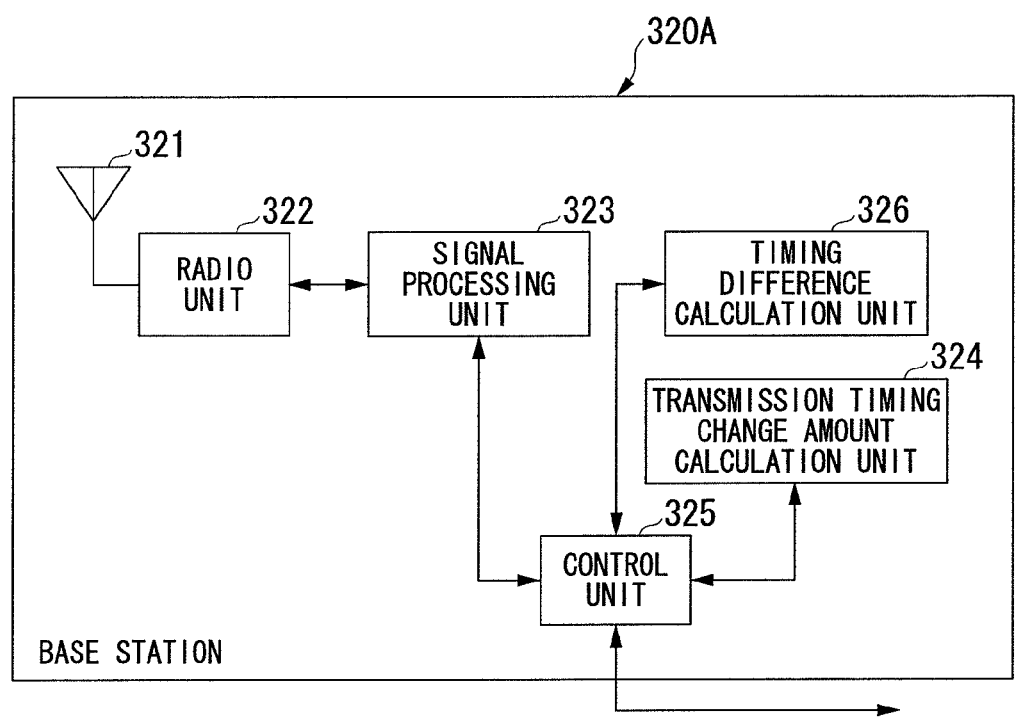
FIG. 8 is a schematic block diagram showing a configuration of a base station 320A according to a third embodiment of the present invention.

FIG. 8 is a schematic block diagram showing a configuration of the base station 320A according to the third embodiment of the present invention. If transmission/reception timings of the base stations 320A and 320B are not consistent, the base station 320A of FIG. 8 calculates a transmission timing change amount based on a signal received by the signal processing unit from the mobile station or timing information (time $T_D$) received from another base station via the core network and a timing difference (time $T_{AB}$) received from the timing difference calculation unit.

Because a configuration of the base station 320B is the same as that of the base station 320A, description thereof is omitted.

The base station 320A includes an antenna 321, a radio unit 322, a signal processing unit 323, a transmission timing change amount calculation unit 324, a control unit 325, and a timing difference calculation unit 326.

The antenna 321 receives a signal transmitted by the mobile station 400 and outputs the received signal to the radio unit 322. In addition, the antenna 321 transmits a signal output by the radio unit 322 as a radio signal to the mobile station 400.

The radio unit 322 down-converts a signal output by the antenna 321 and outputs the down-converted signal to the signal processing unit 323. In addition, the radio unit 322 up-converts a signal output by the signal processing unit 323, and outputs the up-converted signal to the antenna 321.

The signal processing unit 323 performs a process of demodulating the signal output by the radio unit 322, and outputs the demodulated signal to the control unit 325. In addition, the signal processing unit 323 acquires data to be transmitted by the base station 320A to the mobile station 400 from the control unit 325, performs a process of modulating the data, and outputs the modulated data to the radio unit 322.

The transmission timing change amount calculation unit 324 determines a transmission timing change amount of which an indication is sent to the mobile station 400 on the basis of timing information received from the mobile station 400 output by the control unit 325 or a timing difference received from the core network. When the mobile station 400 switches a communication destination from the base station 320A to the base station 320B, the transmission timing change amount indicates how much the mobile station 400 needs to change signal transmission timing. The transmission timing change amount calculation unit 324 outputs information of the calculated transmission timing change amount to the control unit 325.

The control unit 325 transmits the information output by the signal processing unit 323 or the transmission timing change amount calculation unit 324 or the information related to the transmission/reception timing of the base station to the core network. In addition, the control unit 325 outputs information (transmission/reception timing, a transmission timing change amount, or the like of the base station) received from the core network to the signal processing unit 323, the transmission timing change calculation unit 324, and the timing difference calculation unit 326.

The timing difference calculation unit 326 calculates a timing difference on the basis of transmission/reception timing information of the base station received from the control unit 325, and outputs the calculated timing difference to the control unit 325.

Figure 9:
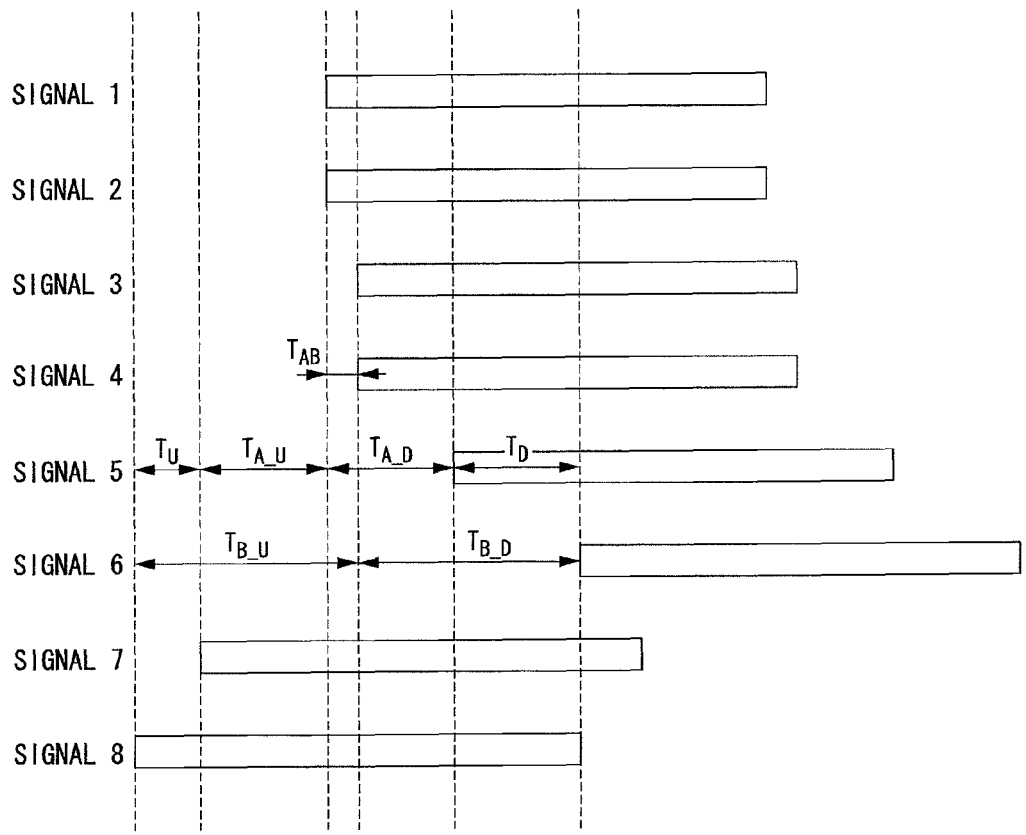
FIG. 9 is a diagram showing a relationship between transmission/reception timings of base stations 320A and 320B and a mobile station 400 according to the third embodiment of the present invention.

FIG. 9 is a diagram showing a relationship between transmission/reception timings of the base stations 320A and 320B and the mobile station 400 according to the third embodiment of the present invention. In FIG. 9, the horizontal axis represents time. A white rectangle indicates a radio frame at a certain moment.

Signal 1 of FIG. 9 indicates transmission timing of the base station 320A.

Signal 2 of FIG. 9 indicates reception timing of the base station 320A.

Signal 3 of FIG. 9 indicates transmission timing of the base station 320B.

Signal 4 of FIG. 9 indicates reception timing of the base station 320B.

Signal 5 of FIG. 9 indicates reception timing of a signal from the base station 320A in the mobile station 400.

Signal 6 of FIG. 9 indicates reception timing of a signal from the base station 320B in the mobile station 400.

Signal 7 of FIG. 9 indicates transmission timing of the mobile station 400 before the handover.

Signal 8 of FIG. 9 indicates transmission timing of the mobile station 400 after the handover.

As shown in signal 4 of FIG. 9, transmission/reception timings of the base stations 320A and 320B are shifted by time $T_{AB}$.

In CoMP, it is assumed that the base stations 320A and 320B are synchronized. However, in the third embodiment, the case where the base stations 320A and 320B are not accurately synchronized and a slight shift is caused will be described.

In this case, as in the first embodiment, UL and DL propagation delays are considered to be identical. Thereby, it is possible to obtain time $T_U$ from time $T_{AB}$ of a transmission/reception timing difference between signals of the base stations 320A and 320B and time $T_D$ of a timing difference between signals of the base stations 320A and 320B received by the mobile station 400 using the following Equations (1) to (4). Time $T_U$ is a difference between transmission timing after the handover and transmission timing before the handover. Time $T_{B\_D}$ is a DL propagation delay between the base station 320B and the mobile station 400. In addition, time $T_{A\_D}$ is a DL propagation delay between the base station 320A and the mobile station 400. Time $T_{B\_U}$ is a UL propagation delay between the base station 320B and the mobile station 400. In addition, time $T_{A\_U}$ is a UL propagation delay between the base station 320A and the mobile station 400.

$$T_D = T_{B\_D} + T_{AB} - T_{A\_D} \quad (1)$$

The following Equation (2) is derived on the basis of Equation (1).

$$T_{B\_D} - T_{A\_D} = T_D - T_{AB} \quad (2)$$

$$T_U = T_{B\_U} - T_{A\_U} - T_{AB} \quad (3)$$

Considering $T_{B\_U} = T_{A\_U}$ and $T_{B\_D} = T_{B\_U}$, the following Equation (4) is derived.

$$T_U = T_{B\_D} - T_{A\_D} - T_{AB} = T_D - T_{AB} - T_{AB} = T_D - 2T_{AB} \quad (4)$$

It is possible to calculate time $T_{AB}$ by exchanging timing information in each of the base stations 320A and 320B. For example, it is possible to calculate a timing difference between the base stations 320A and 320B by comparing it to an absolute time using a global positioning system (GPS).

Accordingly, the mobile station 400 reports time $T_D$ to the base station 320A or 320B, so that the base station 320A or 320B can calculate time $T_U$.

It is possible to calculate time $T_U$ by the same principle even when transmission/reception timings within the base station are not synchronized.

In the case using the third embodiment, as in the first embodiment, a fast handover in which the mobile station 400 does not need to perform a random access to the base station 320B can be performed. Consequently, the mobile station 400 can smoothly change a communication destination without causing instantaneous interruption of communication or the like.

[Fourth Embodiment]

Next, a communication system according to the fourth embodiment of the present invention will be described. The case where the mobile station calculates time $T_U$ in the third embodiment will be described in the fourth embodiment.

Description of the same parts of the fourth embodiment as those of the first embodiment is omitted. The communication system according to the fourth embodiment of the present invention includes base stations and a mobile station. Because a configuration of the mobile station according to the fourth embodiment is the same as that of the mobile station 410 according to the second embodiment, description thereof is omitted.

In the fourth embodiment, a mobile station 410 performs a handover from a base station 330A to a base station 330B.

Figure 10:
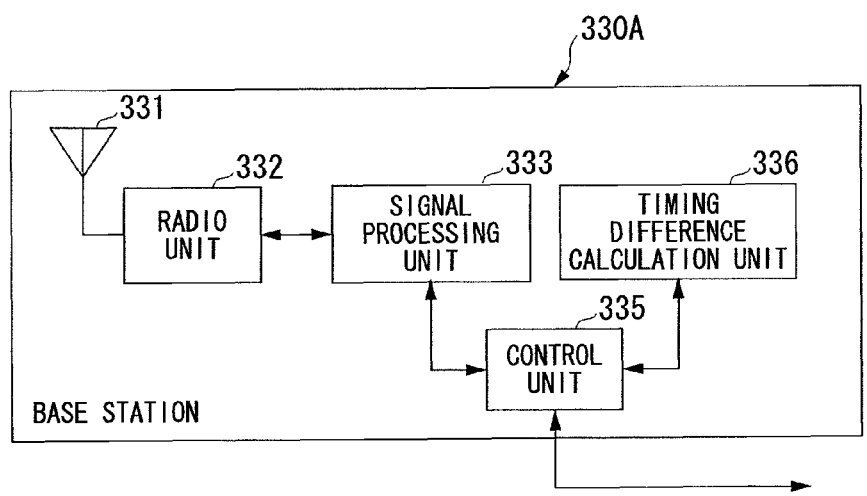
FIG. 10 is a schematic block diagram showing a configuration of a base station 330A according to a fourth embodiment of the present invention.

FIG. 10 is a schematic block diagram showing a configuration of the base station 330A according to the fourth embodiment of the present invention. If transmission/reception timings of the base stations 330A and 330B are not consistent, the base station 330A of FIG. 10 receives transmission/reception timing information of another base station via an upper layer, measures a transmission/reception timing difference (time $T_{AB}$) between the base stations, and notifies the mobile station 410 of time $T_{AB}$. The mobile station 410 calculates a transmission timing change amount.

Because a configuration of the base station 330B is the same as that of the base station 330A, description thereof is omitted.

The base station 330A includes an antenna 331, a radio unit 332, a signal processing unit 333, a control unit 335, and a timing difference calculation unit 336.

The antenna 331 receives a signal transmitted by the mobile station 410 and outputs the received signal to the radio unit 332. In addition, the antenna 331 transmits a signal output by the radio unit 332 as a radio signal to the mobile station 410.

The radio unit 332 down-converts a signal output by the antenna 331 and outputs the down-converted signal to the signal processing unit 333. In addition, the radio unit 332 up-converts a signal output by the signal processing unit 333, and outputs the up-converted signal to the antenna 331.

The signal processing unit 333 performs a process of demodulating the signal output by the radio unit 332, and outputs the demodulated signal to the control unit 335. In addition, the signal processing unit 333 acquires data to be transmitted by the base station 330A to the mobile station 410 from the control unit 335, performs a process of modulating the data, and outputs the modulated data to the radio unit 332.

The control unit 335 transmits information output by the signal processing unit 333 to the core network. In addition, the control unit 335 outputs information (transmission/reception timing of the base station and the like) received from the core network to the signal processing unit 323 and the timing difference calculation unit 336.

The timing difference calculation unit 336 calculates a timing difference on the basis of transmission/reception timing information of the base station received from the control unit 335, and outputs the calculated timing difference to the control unit 335.

Figure 11:
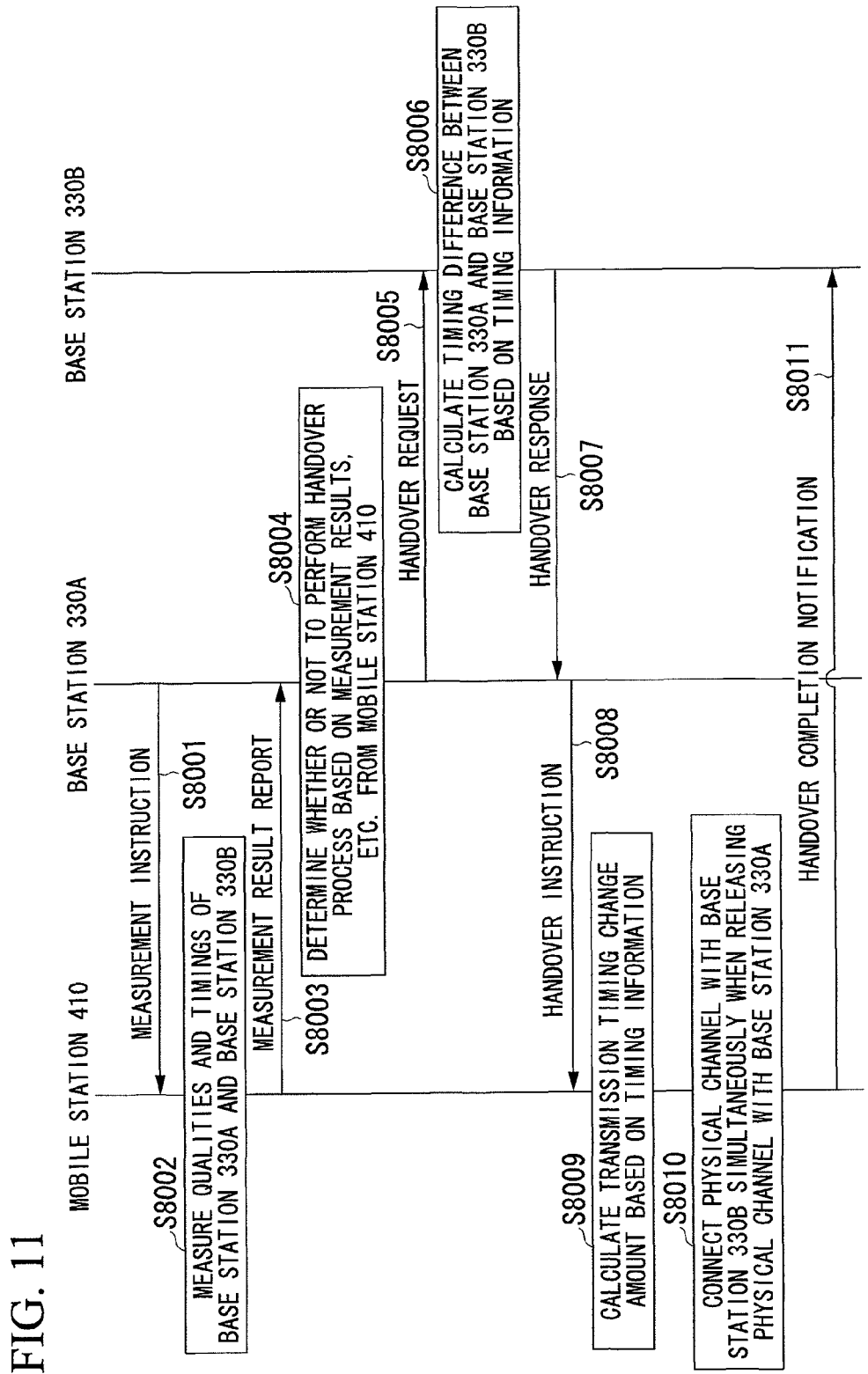
FIG. 11 is a sequence diagram showing a handover process of a communication system according to the fourth embodiment of the present invention.

FIG. 11 is a sequence diagram showing a handover process of the communication system according to the fourth embodiment of the present invention.

First, the radio unit 333 of the base station 330A transmits a measurement instruction to the mobile station 410 via the antenna 331 (step S8001).

The control unit 415 of the mobile station 410 receives the measurement instruction transmitted from the base station 330A in step S8001. The quality/timing measurement unit 414 of the mobile station 410 measures reception qualities or reception timings of RSs transmitted by the base stations 330A and 330B (step S8002).

The control unit 415 of the mobile station 410 transmits measurement results including the reception qualities measured in step S8002 to the base station 330A via the signal processing unit 413, the radio unit 412, and the antenna 411 (step S8003).

The control unit 335 of the base station 330A determines whether or not to perform the handover process based on a measurement result report received from the mobile station 410 in step S8003 (step S8004). The control unit 335 of the fourth embodiment determines whether or not to perform the handover process using the same method as that of the control unit 305 of the first embodiment.

When determining to perform the handover process in step S8004, the control unit 335 of the base station 330A transmits a handover request including transmission timing information of the base station 330A to the base station 330B via the signal processing unit 333, the radio unit 332, and the antenna 331 (step S8005).

The timing difference calculation unit 336 of the base station 330B calculates a timing difference between the base stations 330A and 330B on the basis of the timing information received in step S8005 and the transmission timing information of the base station 330B (step S8006). The timing difference calculation unit 336 of the fourth embodiment calculates a timing difference using the same method as that of the timing difference calculation unit 326 of the third embodiment.

The control unit 335 of the base station 330B transmits a handover response including the timing difference calculated in step S8006 to the base station 330A via the signal processing unit 333, the radio unit 332, and the antenna 331 (step S8007).

The control unit 335 of the base station 330A transmits a handover instruction including information of the timing difference received in step S8007 to the mobile station 410 via the signal processing unit 333, the radio unit 332, and the antenna 331 (step S8008).

Upon receipt of the handover instruction in step S8008, the transmission timing change calculation unit 416 of the mobile station 410 calculates a transmission timing change amount on the basis of the information of the timing difference included in the handover instruction and the information of the reception timings measured in step S8002 (step S8009).

The control unit 415 of the mobile station 410 releases a physical channel with the base station 330A, changes transmission timing on the basis of the transmission timing change amount calculated in step S8009, and connects a physical channel with the base station 330B (step S8010). Thereby, the mobile station 410 performs the handover from the base station 330A to the base station 330B.

The control unit 415 of the mobile station 410 transmits a handover completion notification to the base station 330B via the signal processing unit 413, the radio unit 412, and the antenna 411 (step S8011).

In the case using the fourth embodiment, as in the second embodiment, a fast handover in which the mobile station 410 does not need to perform a random access to the base station 330B can be performed. Consequently, the mobile station 410 can smoothly change a communication destination without causing instantaneous interruption of communication or the like.

[Fifth Embodiment]

Next, a communication system according to the fifth embodiment of the present invention will be described. Description of the same parts of the fifth embodiment as those of the first embodiment is omitted. The communication system according to the fifth embodiment of the present invention includes base stations 300A and 300B and a mobile station 400 as in the first embodiment.

Physical channels and physical-signal transmission/reception methods and a relationship between transmission/reception timings of the base stations 300A and 300B and the mobile station 400 are the same as in the first embodiment.

Figure 12:
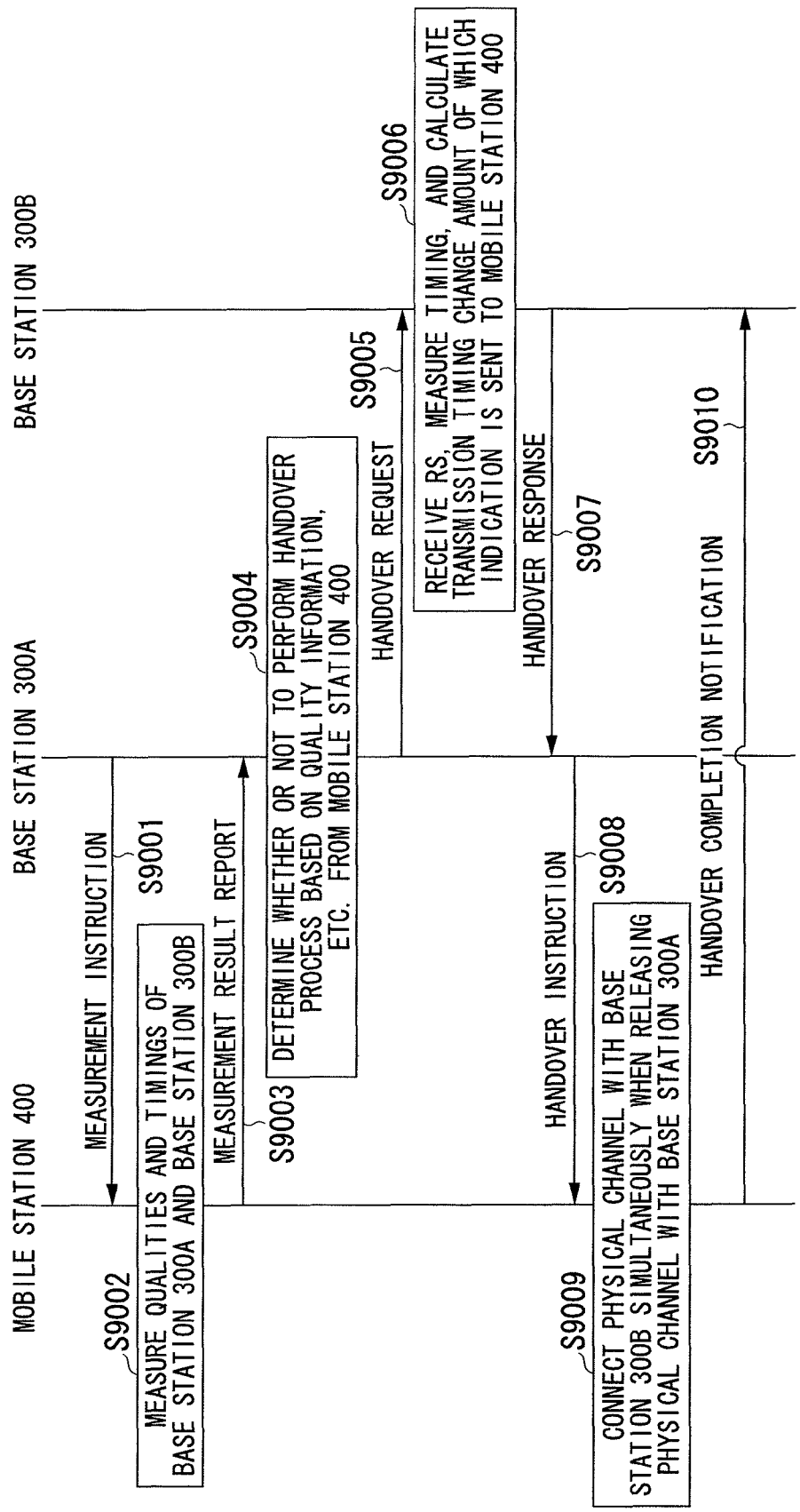
FIG. 12 is a sequence diagram showing a handover process of a communication system according to a fifth embodiment of the present invention.

FIG. 12 is a sequence diagram showing a handover process of the communication system according to the fifth embodiment of the present invention.

First, the control unit 305 of the base station 300A transmits a measurement instruction to the mobile station 400 via the signal processing unit 303, the radio unit 302, and the antenna 301 (step S9001). The measurement instruction is used to instruct the mobile station 400 to measure reception qualities, reception timings, or the like of signals transmitted from peripheral base stations (the base station 300B and the like) including the base station 300A.

The control unit 405 of the mobile station 400 receives the measurement instruction transmitted by the base station 300A in step S9001 via the antenna 401, the radio unit 402, and the signal processing unit 403. The quality/timing measurement unit 404 of the mobile station 400 measures reception qualities or reception timings of RSs transmitted from the peripheral base stations 300A and 300B (step S9002). In the reception quality measurement, a reception level, path loss, S/N, or the like of RS is used.

The control unit 405 of the mobile station 400 transmits measurement results including the reception qualities measured in step S9002 to the base station 300A via the signal processing unit 403, the radio unit 402, and the antenna 401 (step S9003).

The control unit 305 of the base station 300A determines whether or not to perform the handover process on the basis of a measurement result report of step S9003 (step S9004). For example, if the reception quality of the mobile station 400 for the signal transmitted by the neighboring base station 300B is better than the reception quality of the mobile station 400 for the signal transmitted by the base station 300A, the control unit 305 of the base station 300A determines to perform the handover process.

When determining to perform the handover process in step S9004, the control unit 305 of the base station 300A transmits a handover request including RS-related information to the base station 300B via the signal processing unit 303, the radio unit 302, and the antenna 301 (step S9005). The RS-related information is information such as a transmission cycle related to RS.

The transmission timing change amount calculation unit 304 of the base station 300B receives RS transmitted from the mobile station 400 to the base station 300A via the antenna 301, the radio unit 302, the signal processing unit 303, and the control unit 305 on the basis of the RS-related information received in step S9005. The transmission timing change amount calculation unit 304 measures RS reception timing and calculates a transmission timing change amount of which an indication is sent to the mobile station 400 (step S9006).

If a preparation related to the handover is completed, the control unit 305 of the base station 300B receiving the handover request in step S9005 transmits a handover response including the transmission timing change amount calculated in step S9006 to the base station 300A via the signal processing unit 303, the radio unit 302, and the antenna 301 (step S9007).

The control unit 305 of the base station 300A receiving the handover response in step S9007 transmits a handover instruction including the transmission timing change amount to the mobile station 400 via the signal processing unit 303, the radio unit 302, and the antenna 301 (step S9008).

The control unit 405 of the mobile station 400 releases a physical channel with the base station 300A, changes transmission timing on the basis of the indicated transmission timing change amount, and connects a physical channel with the base station 300B (step S9009).

The control unit 405 of the mobile station 400 transmits a handover completion notification to the base station 300B via the signal processing unit 403, the radio unit 402, and the antenna 401 (step S9010).

That is, in FIG. 12, when determining to perform the handover process, the base station 300A notifies the base station 300B of information (a transmission cycle or the like) related to RS received by the base station 300A along with the handover request. The base station 300B receives RS directed to the base station 300A, which is not usually received, on the basis of the information related to RS received from the base station 300A, and measures transmission timing from the mobile station on the basis of RS.

Thereby, it is possible to exclude an influence of UL and DL propagation delay differences in the case of FDD and more accurately calculate transmission timing. The base station 300B calculates a transmission timing change amount of which an indication is sent to the mobile station 400, and notifies the base station 300A of completion along with the transmission timing change amount when a preparation related to the handover is completed.

[Sixth Embodiment]

Next, a communication system according to the sixth embodiment of the present invention will be described. Description of the same parts of the sixth embodiment as those of the first embodiment is omitted. The communication system according to the sixth embodiment of the present invention includes base stations 300A and 300B and a mobile station 400 as in the first embodiment.

Physical channels, physical-signal transmission/reception methods and a relationship between transmission/reception timings of the base stations and the mobile station are the same as in the first embodiment.

Figure 13:
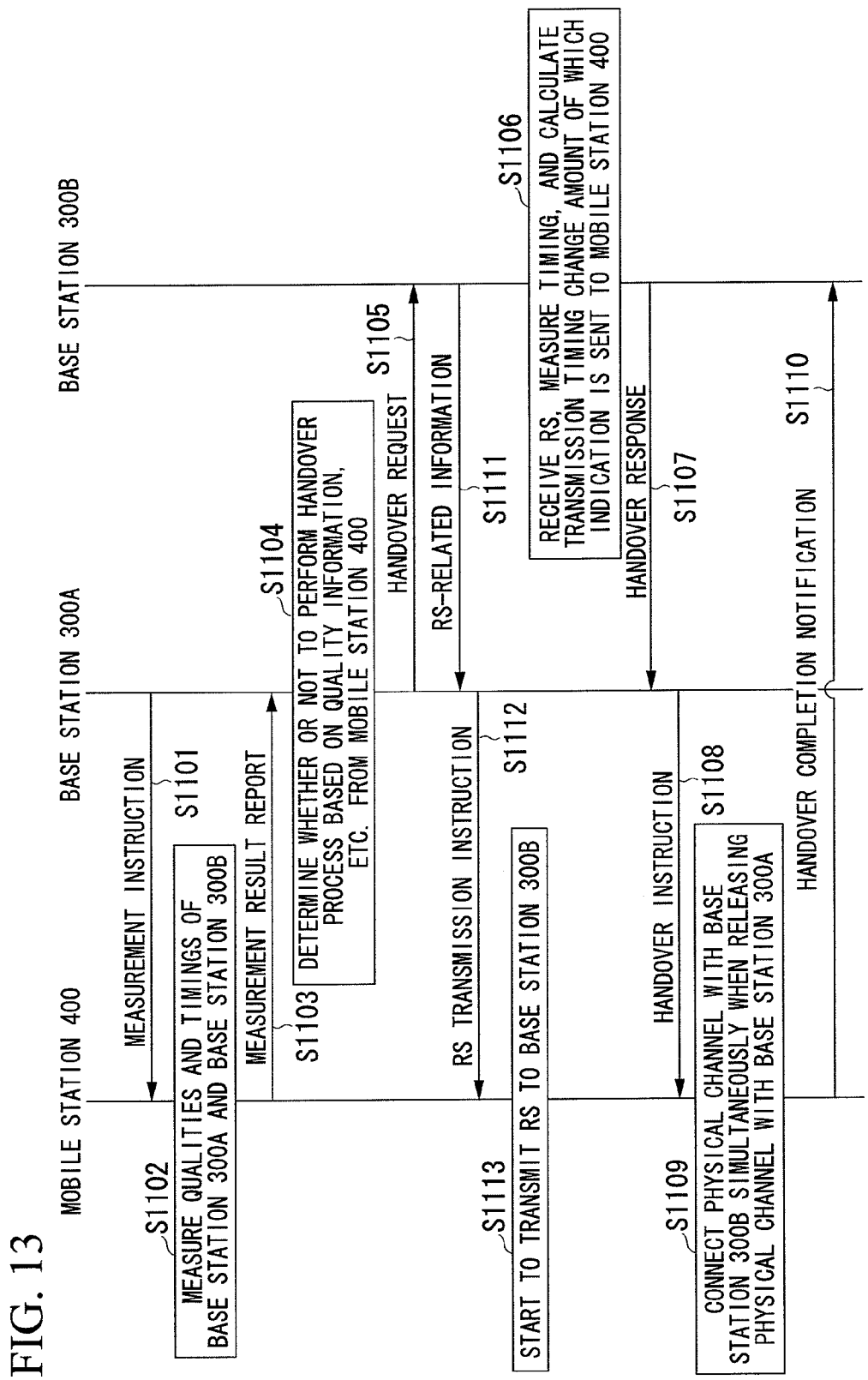
FIG. 13 is a sequence diagram showing a handover process of a communication system according to a sixth embodiment of the present invention.

FIG. 13 is a sequence diagram showing a handover process of the communication system according to the sixth embodiment of the present invention.

First, the control unit 305 of the base station 300A transmits a measurement instruction to the mobile station 400 via the signal processing unit 303, the radio unit 302, and the antenna 301 (step S1101). The measurement instruction is used to instruct the mobile station 400 to measure reception qualities, reception timings, or the like of signals transmitted from peripheral base stations (the base station 300B and the like) including the base station 300A.

The control unit 405 of the mobile station 400 receives the measurement instruction of step S1101 via the antenna 401, the radio unit 402, and the signal processing unit 403. The quality/timing measurement unit 404 of the mobile station 400 measures reception qualities or reception timings of RSs transmitted from the peripheral base stations 300A and 300B (step S1102). In the reception quality measurement, a reception level, path loss, S/N, or the like of RS is used.

The control unit 405 of the mobile station 400 transmits measurement results including the reception qualities measured in step S1102 to the base station 300A via the signal processing unit 403, the radio unit 402, and the antenna 401 (step S1103).

The control unit 305 of the base station 300A determines whether or not to perform the handover process on the basis of a measurement result report of step S1103 (step S1104). For example, if the reception quality of the mobile station 400 for the signal transmitted by the neighboring base station 300B is better than the reception quality of the mobile station 400 for the signal transmitted by the base station 300A, the control unit 305 of the base station 300A determines to perform the handover process.

When determining to perform the handover process in step S1104, the control unit 305 of the base station 300A transmits a handover request to the base station 300B via the signal processing unit 303, the radio unit 302, and the antenna 301 (step S1105).

The control unit 305 of the base station 300B transmits RS-related information to the base station 300A via the signal processing unit 303, the radio unit 302, and the antenna 301 (step S1111).

The control unit 305 of the base station 300A transmits an RS transmission instruction including the RS-related information to the mobile station 400 via the signal processing unit 303, the radio unit 302, and the antenna 301 (step S1112).

The control unit 405 of the mobile station 400 initiates the transmission of RS to the base station 300B via the signal processing unit 403, the radio unit 402, and the antenna 401 (step S1113).

The transmission timing change calculation unit 304 of the base station 300B receives RS of which the transmission has been initiated by the mobile station 400 in step S1113 via the antenna 301, the radio unit 302, the signal processing unit 303, and the control unit 305. The transmission timing change amount calculation unit 304 measures transmission timing of RS and calculates a transmission timing change amount of which an indication is sent to the mobile station 400 (step S1106).

If a preparation related to the handover is completed, the control unit 305 of the base station 300B transmits a handover response including the transmission timing change amount calculated in step S1106 to the base station 300A via the signal processing unit 303, the radio unit 302, and the antenna 301 (step S1107).

The control unit 305 of the base station 300A transmits a handover instruction including the transmission timing change amount to the mobile station 400 via the signal processing unit 303, the radio unit 302, and the antenna 301 (step S1108).

The control unit 405 of the mobile station 400 releases a physical channel with the base station 300A, changes transmission timing on the basis of the indicated transmission timing change amount, and connects a physical channel with the base station 300B (step S1109).

The control unit 405 of the mobile station 400 transmits a handover completion notification to the base station 300B via the signal processing unit 403, the radio unit 402, and the antenna 401 (step S1110).

That is, in FIG. 13, when determining to perform the handover process, the base station 300A requests the base station 300B to perform the handover. The base station 300B notifies the base station 300A of information (a transmission cycle or the like) related to RS. The base station 300A instructs the mobile station 400 to transmit RS along with information related to RS received from the base station 300B. Because RS is periodically transmitted, frequency hopping or the like is also performed. In addition, a sequence of RS is generated on the basis of a cell identifier (ID). It is possible to use a method of performing transmission in code division multiplexing (CDM) in a sequence in which RS (RS generated on the basis of a cell ID of the base station 300A) transmitted to the base station 300A is orthogonal to RS (RS generated on the basis of a cell ID of the base station 300B) transmitted to the base station 300B at the same timing and the same frequency, or use a method of performing transmission in time division multiplexing (TDM) or frequency division multiplexing (FDM) by changing timing or frequency.

In addition, a method of defining a pseudo-cell ID to be used commonly in a base station that performs CoMP and transmitting RS generated on the basis of the cell ID to the base stations 300A and 300B may be used. In the above-described method, the mobile station 400 initiates the transmission of RS. The base station 300B receives RS transmitted from the mobile station 400, and measures timing from the mobile station 400. Thereby, it is possible to exclude an influence of UL and DL propagation delay differences in the case of FDD and more accurately calculate transmission timing.

The base station 300B calculates a transmission timing change amount of which an indication is sent to the mobile station 400, and notifies the base station 300A of completion along with the transmission timing change amount when a preparation related to the handover is completed.

[Seventh Embodiment]

Next, a communication system according to the seventh embodiment of the present invention will be described.

Description of the same parts of the seventh embodiment as those of the first embodiment is omitted. In the above-described first embodiment and the like, DL data is transmitted from both base stations 300A and 300B. However, in the seventh embodiment, as in FIG. 14, DL data is transmitted only from the base station 300A before the handover as in the case of LTE.

A difference from LTE is that the base stations 300A and 300B share information, thereby performing scheduling or beam-forming in a coordinated manner and reducing interference. Accordingly, the mobile station 400 receives PDSCH transmitted from the base station 300A and demodulates data. In addition, the mobile station 400 needs to receive PDCCH on which scheduling information is transmitted, PCFICH necessary to receive PDCCH, and RS necessary for channel estimation in order to demodulate PDSCH. Thus, the mobile station 400 also receives these channels from the base station 300A. The mobile station 400 also needs to receive RS from the base station 300A in order to perform channel estimation.

In addition, UL data is only transmitted from the mobile station 400 to the base station 300A. Thus, only the base station 300A receives PUSCH. Accordingly, the mobile station 400 receives PHICH on which ACK/NACK of HARQ for PUSCH is notified from the base station 300A. In addition, for example, the mobile station 400 needs to notify each base station of CQI or PMI using PUCCH as information necessary for the base stations 300A and 300B to perform scheduling or beam-forming in a coordinated manner. Here, only the base station 300A receives PUCCH from the mobile station 400. In addition, only the base station 300A also receives RS necessary to demodulate PUSCH or PUCCH from the mobile station 400.

Accordingly, CQI or PMI is notified to the base station 300B via the base station 300A, if necessary. Consequently, only the base station 300A usually receives a UL physical channel or physical signal from the mobile station 400. After the handover, conversely, only the base station 300B receives a UL channel or signal from the mobile station 400.

Figure 14:
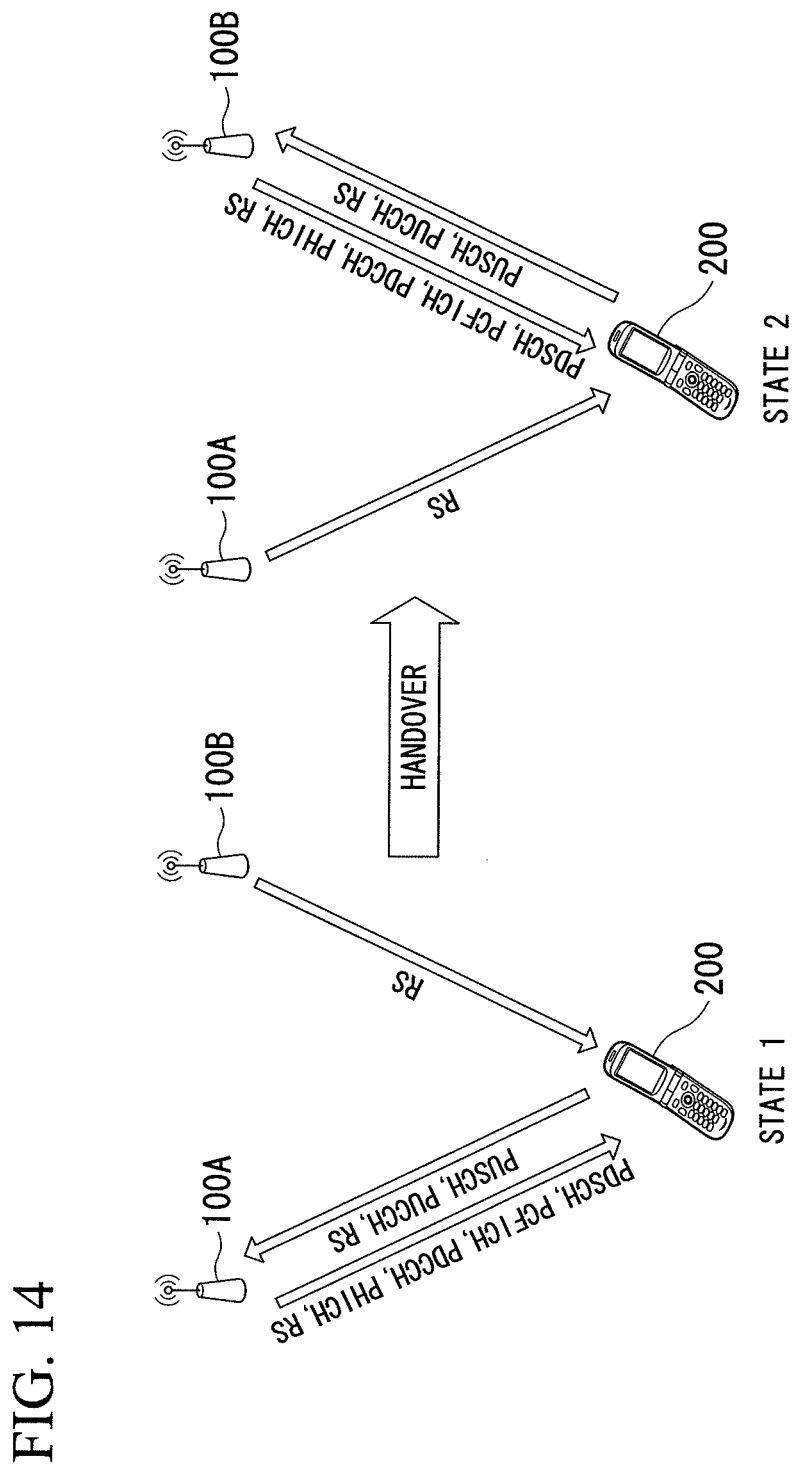
FIG. 14 is a diagram showing signals transmitted/received between base stations 100A and 100B and a mobile station 200 before/after a handover in LTE.
Figure 15:
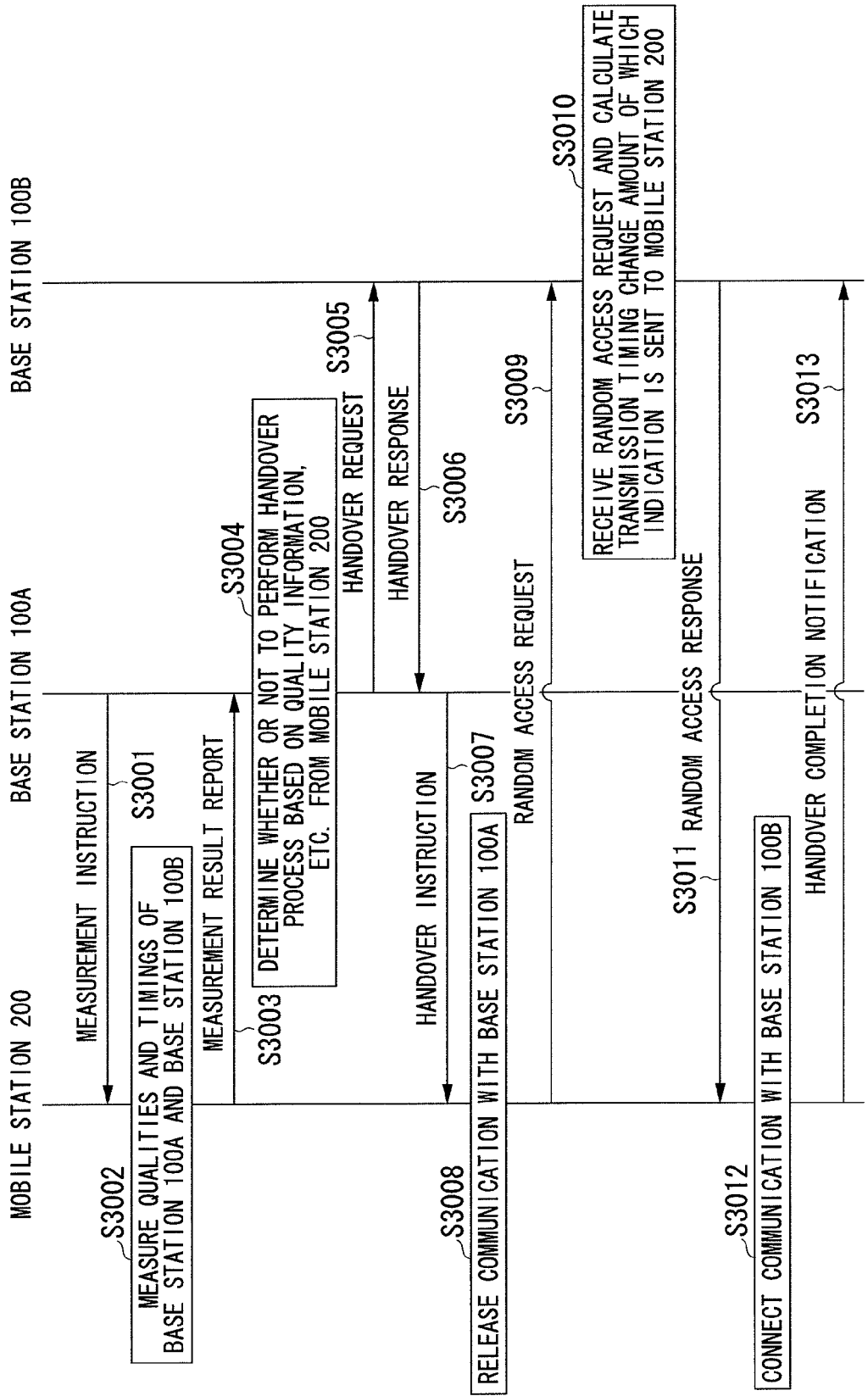
FIG. 15 is a sequence diagram showing processes of a mobile station 200 and base stations 100A and 100B in LTE.

The above-described embodiments are applicable to the configuration as in FIG. 14. A handover procedure is the same as in the above-described embodiments.

The base station may select one suitable for a state from among handover processes of the above-described embodiments and the related art. If necessary, a process that has been selected may be notified in a message of a measurement instruction, an RS transmission instruction, a handover instruction, or the like. In addition, a process that has been selected may be notified by preparing another message.

Although the case where the number of base stations is two has been described in the above-described embodiments, the present invention is not limited thereto. The number of base stations may be equal to or greater than three.

In addition, in the above-described embodiment, a program for implementing functions of the base station or the mobile station may be recorded on a computer readable recording medium. A control of the base station or the mobile station may be performed by enabling a computer system to read and execute the program recorded on the recording medium. The "computer system" used herein includes an operating system (OS) and hardware, such as peripheral devices.

The "computer readable recording medium" is a portable medium such as a flexible disk, magneto-optical disc, read only memory (ROM) and compact disc-ROM (CD-ROM), and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments, and any design in the scope without departing from the subject matter of the present invention is included in the claims.

Industrial Applicability

The present invention is applicable to a communication system, a mobile station, a base station, a communication method, and the like capable of performing a fast handover in which a mobile station does not need to perform a random access to a base station.

Reference Symbols 300A, 300B: Base station
301: Antenna
302: Radio unit
303: Signal processing unit
304: Transmission timing change amount calculation unit
305: Control unit
310A, 310B: Base station
311: Antenna
312: Radio unit
313: Signal processing unit
315: Control unit
320A, 320B: Base station
321: Antenna
322: Radio unit
323: Signal processing unit
324: Transmission timing change amount calculation unit
325: Control unit
326: Timing difference calculation unit
330A, 330B: Base station
331: Antenna
332: Radio unit
333: Signal processing unit
335: Control unit
336: Timing difference calculation unit
400: Mobile station
401: Antenna
402: Radio unit
403: Signal processing unit
404: Quality/timing measurement unit
405: Control unit
410: Mobile station
411: Antenna
412: Radio unit
413: Signal processing unit
414: Quality/timing measurement unit
415: Control unit
416: Transmission timing change amount calculation unit

The invention claimed is:

1. A communication system comprising:
a determination unit, provided in any one of a first base station, a second base station, and a mobile station, configured to determine a transmission timing change amount based on a first reception timing of a first signal and a second reception timing of a second signal, the first signal being transmitted between the first base station and the mobile station, the second signal being transmitted between the second base station and the mobile station, wherein the mobile station comprises a handover execution unit configured to perform a handover from the first base station to the second base station based on the transmission timing change amount calculated by the determination unit.

2. The communication system according to claim 1, wherein the mobile station comprises:
   a measurement unit configured to measure the first and second reception timings; and
   the determination.

3. The communication system according to claim 1, wherein the mobile station comprises:
   a measurement unit configured to measure the first and second reception timings; and
   a transmission unit configured to transmit the first and second reception timings measured by the measurement unit to the first base station,
   wherein the first base station comprises the determination unit and the determination unit is configured to determine the transmission timing change amount based on the first and second reception timings transmitted by the transmission unit.

4. The communication system according to claim 1, wherein the mobile station comprises:
   a measurement unit configured to measure the first and second reception timings; and
   a transmission unit which transmits the reception timings measured by the measurement unit to the second base station,
   wherein the second base station comprises the determination unit and the determination unit is configured to determine the transmission timing change amount based on the first and second reception timings transmitted by the transmission unit.

5. The communication system according to claim 1, wherein
   the determination unit is configured to use, as the transmission timing change amount, the difference between the first reception timing and the second reception timing.

6. The communication system according to claim 1, wherein
   the determination unit is configured to determine the transmission timing change amount based on the first reception timing, the second reception timing, and a time of transmission/reception timing difference between signals of the first base station and the second base station.

7. A mobile station which communicates with first and second base stations, the mobile station comprising:
   a measurement unit configured to measure a first reception timing of a first signal and a second reception timing of a second signal, the first signal being transmitted by the first base station, the second signal being transmitted by the second base station;
   a determination unit configured to determine a transmission timing change amount based on the first and second reception timings measured by the measurement unit; and
   a handover execution unit configured to perform a handover from the first base station to the second base station based on the transmission timing change amount calculated by the determination unit.

8. A base station which communicates with a mobile station and another base station, the base station comprising:
   a reception unit configured to receive a first reception timing of a first signal and a second reception timing of a second signal, the first signal being transmitted between the base station and the mobile station, the second signal being transmitted between the another base station and the mobile station;
   a determination unit configured to determine a transmission timing change amount based on the first and second reception timings received by the reception unit; and
   a transmission unit configured to transmit the transmission timing change amount determined by the determination unit to the mobile station.

9. A communication method comprising:
   determining, by any one of a first base station, a second base station, and a mobile station, a transmission timing change amount based on a first reception timing of a first signal and a second reception timing of a second signal, the first signal being transmitted between the first base station and the mobile station, the second signal being transmitted between the second base station and the mobile station; and
   performing, by the mobile station, a handover from the first base station to the second base station based on the transmission timing change amount calculated in the determination.

* * * * *